United States Patent
Bhattacharjee et al.

(10) Patent No.: US 9,336,258 B2
(45) Date of Patent: May 10, 2016

(54) REDUCING DATABASE LOCKING CONTENTION USING MULTI-VERSION DATA RECORD CONCURRENCY CONTROL

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad Sadoghi Hamedani, White Plains, NY (US); Fabian Nagel, Edinburgh (GB); Kenneth A. Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 14/063,263

(22) Filed: Oct. 25, 2013

(65) Prior Publication Data
US 2015/0120687 A1    Apr. 30, 2015

(51) Int. Cl.
*G06F 17/00*    (2006.01)
*G06F 17/30*    (2006.01)
*G06F 7/00*    (2006.01)

(52) U.S. Cl.
CPC ................ *G06F 17/30362* (2013.01)

(58) Field of Classification Search
None
See application file for complete search history.

(56) References Cited

U.S. PATENT DOCUMENTS

| | | | |
|---|---|---|---|
| 5,870,758 A * | 2/1999 | Bamford | G06F 17/30362 |
| 7,254,592 B1 * | 8/2007 | Matero | G06F 9/466 |
| 7,263,596 B1 * | 8/2007 | Wideman | G06F 3/0608 |
| | | | 709/215 |
| 2005/0033720 A1 * | 2/2005 | Verma | G06F 9/466 |
| 2005/0210218 A1 * | 9/2005 | Hoogterp | G06F 3/0613 |
| | | | 711/203 |
| 2006/0106792 A1 | 5/2006 | Patterson | |
| 2011/0246503 A1 * | 10/2011 | Bender | G06F 17/30306 |
| | | | 707/769 |
| 2013/0103644 A1 | 4/2013 | Shoens | |
| 2013/0173588 A1 | 7/2013 | Ma et al. | |
| 2013/0346725 A1 * | 12/2013 | Lomet | G06F 12/10 |
| | | | 711/206 |

OTHER PUBLICATIONS

Bernstein et al., Concurrency control and recovery in database systems. vol. 370. New York: Addison-wesley, 1987, 359 pages.
Larson et al., "High-Performance Concurrency Control Mechanisms for Main-Memory Databases." Proceedings of the VLDB Endowment, vol. 5, No. 4, Aug. 2012, pp. 298-309.
Ullman et al., "Database systems: the complete book." Upper Saddle River: Prentice Hall, 2001, 570 pages.

* cited by examiner

*Primary Examiner* — Usmaan Saeed
*Assistant Examiner* — Yu Zhao
(74) *Attorney, Agent, or Firm* — Yee & Associates, P.C.; Nidhi G. Kissoon

(57) ABSTRACT

Managing a multi-version data record database is provided. A mapping is maintained between a logical record identifier and committed and uncommitted physical record identifiers corresponding to data records using an indirection mapping table. Entries are updated within an index to point to the logical record identifier instead of the committed and uncommitted physical record identifiers. The committed physical record identifier corresponding to a data record is read from the indirection mapping table to access a committed version of the data record while a writer is modifying the data record to prevent the writer from blocking a reader. An uncommitted physical record identifier corresponding to the data record is written in the indirection mapping table to insert a new uncommitted version of the data record within a data table while the reader is reading the committed version of the particular data record to prevent the reader from blocking the writer.

20 Claims, 21 Drawing Sheets

500

LOCK MODE COMPATIBILITY COMPARISON CHART

|  | SHARE | UPDATE | EXCLUSIVE |
|---|---|---|---|
| SHARE |  |  | 🚫 |
| UPDATE |  | 🚫 | 🚫 |
| EXCLUSIVE | 🚫 | 🚫 | 🚫 |

502 2PL LOCK SCHEME

|  | READ | WRITE | CERTIFY |
|---|---|---|---|
| READ |  |  | 🚫 |
| WRITE |  | 🚫 | 🚫 |
| CERTIFY | 🚫 | 🚫 | 🚫 |

504 2V2PL LOCK SCHEME

FIG. 5

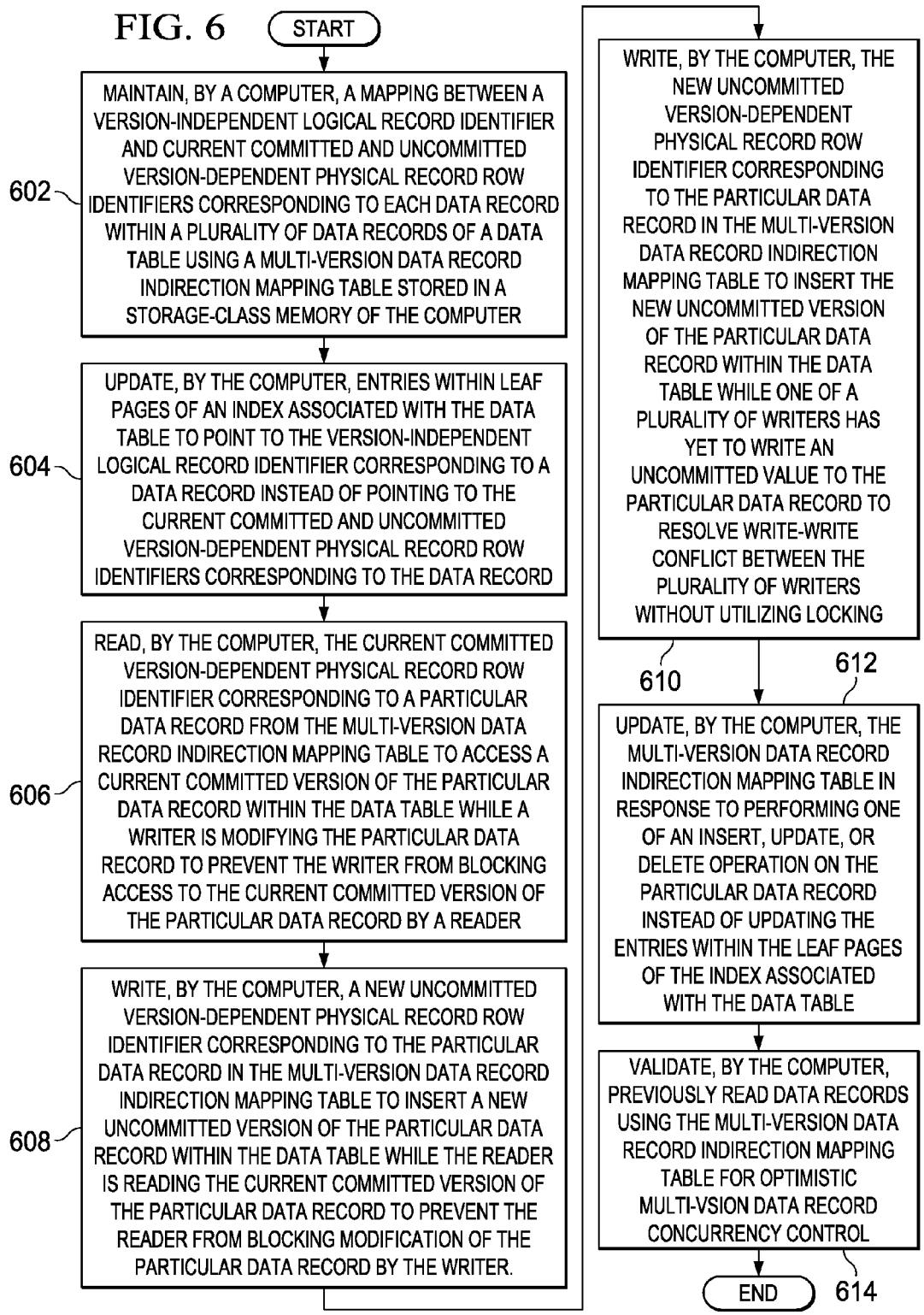

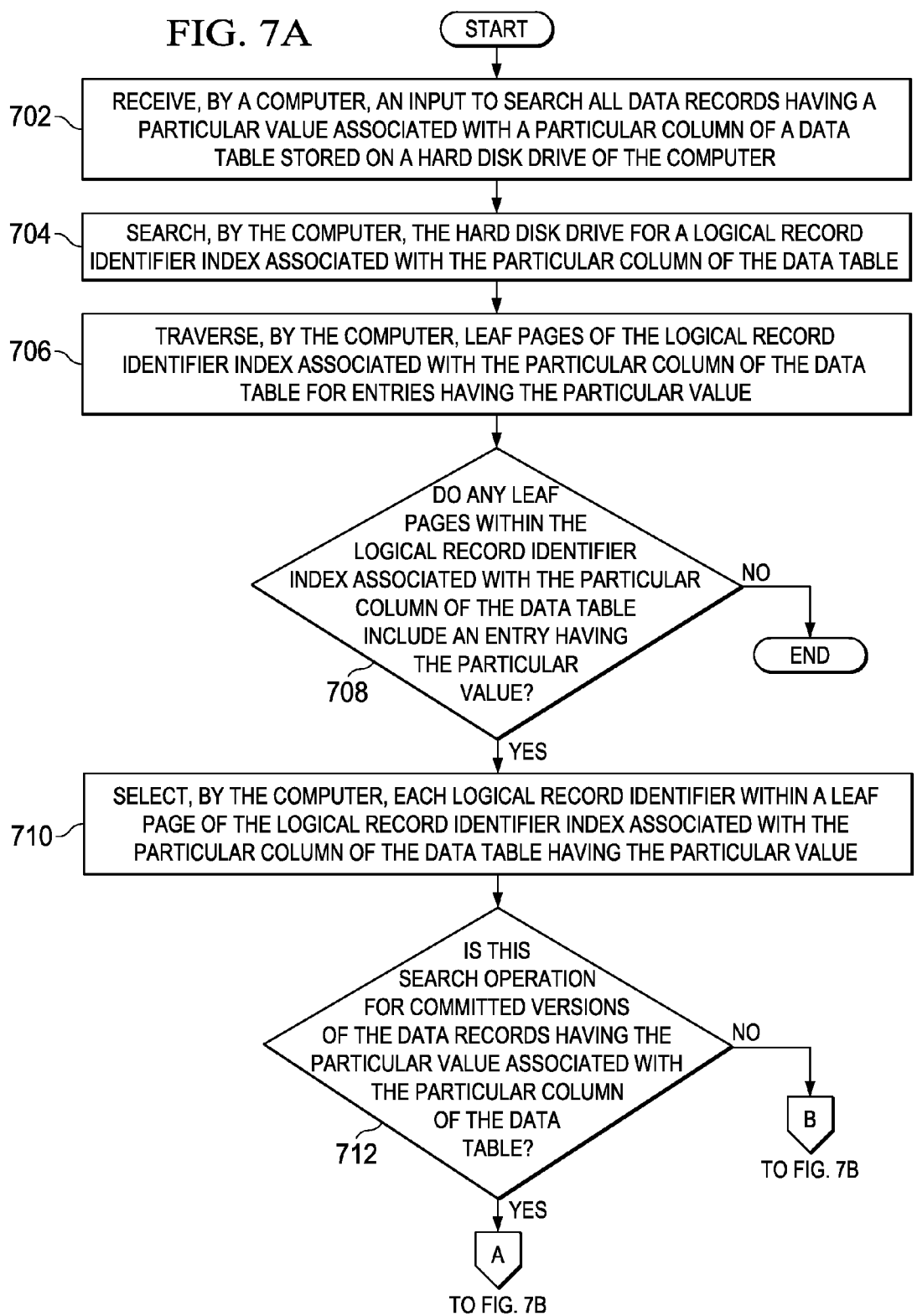

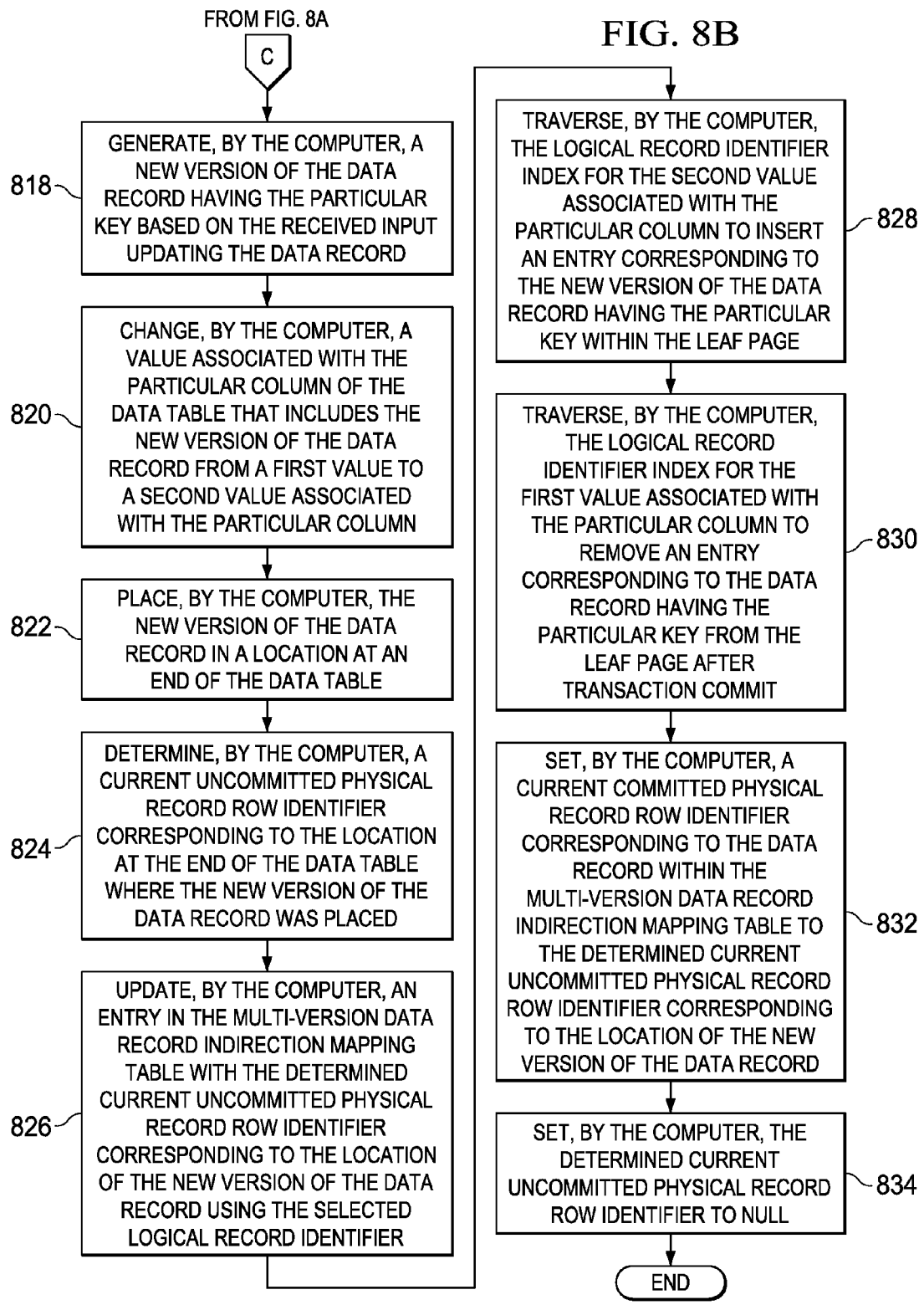

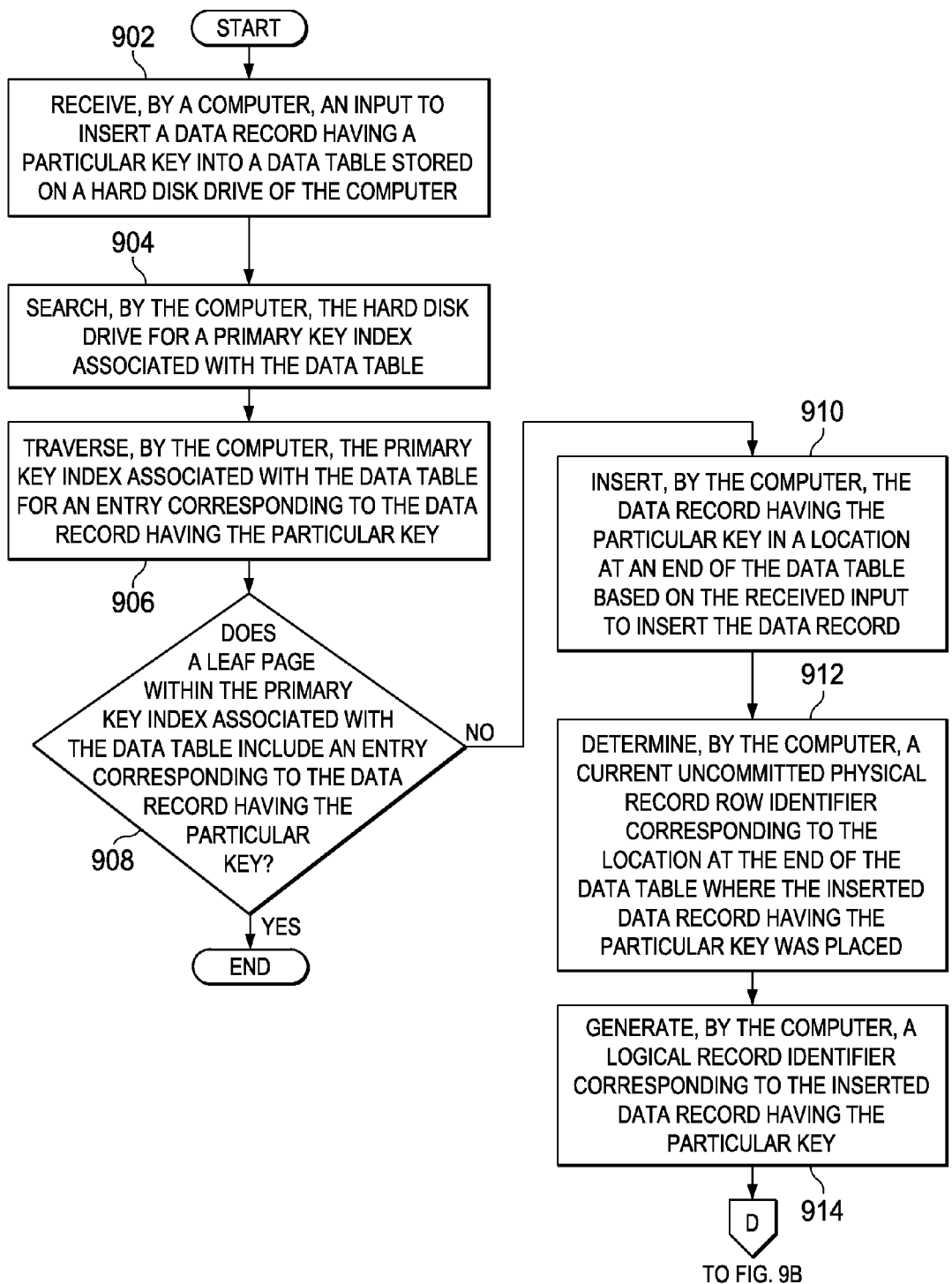

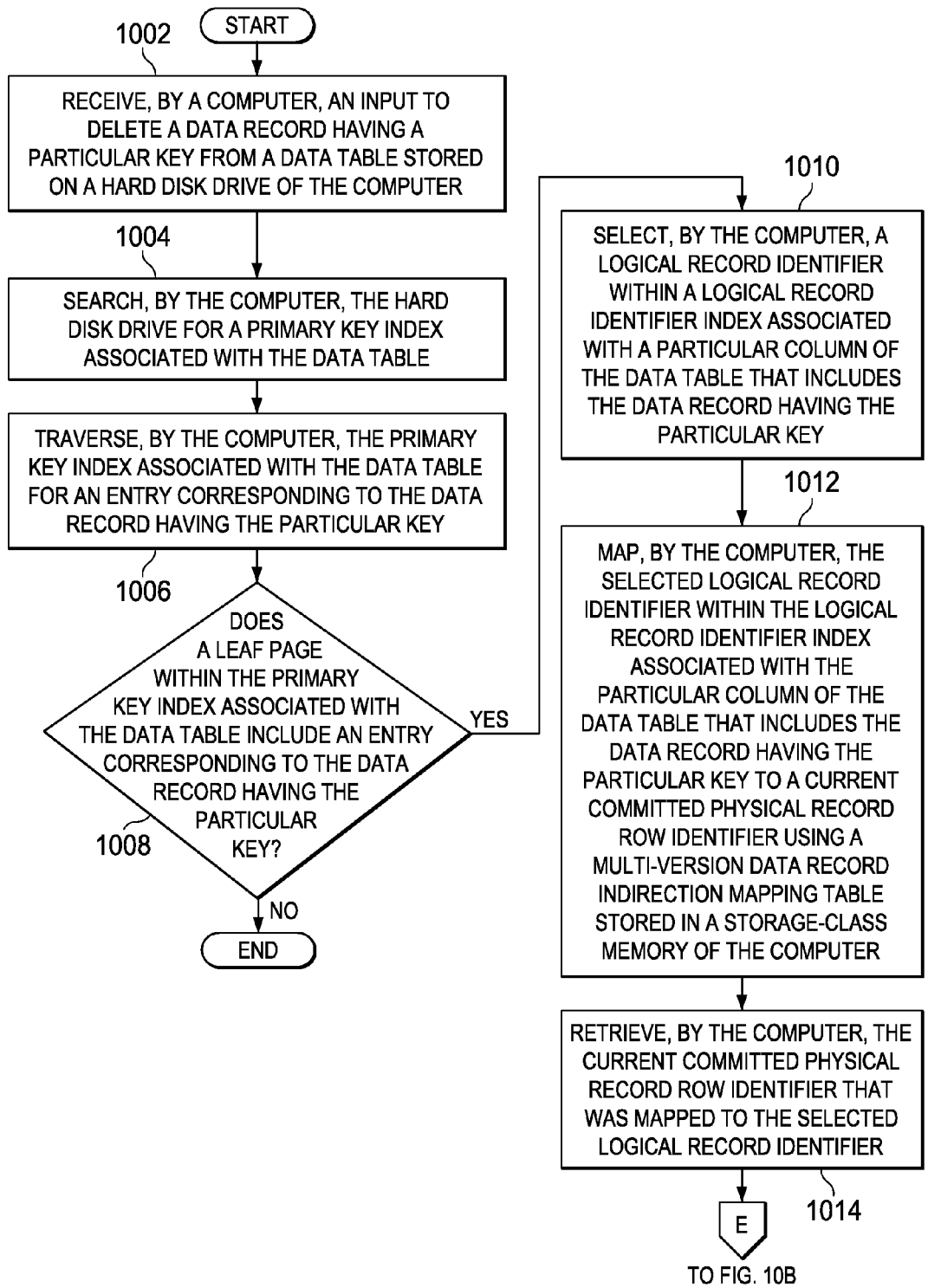

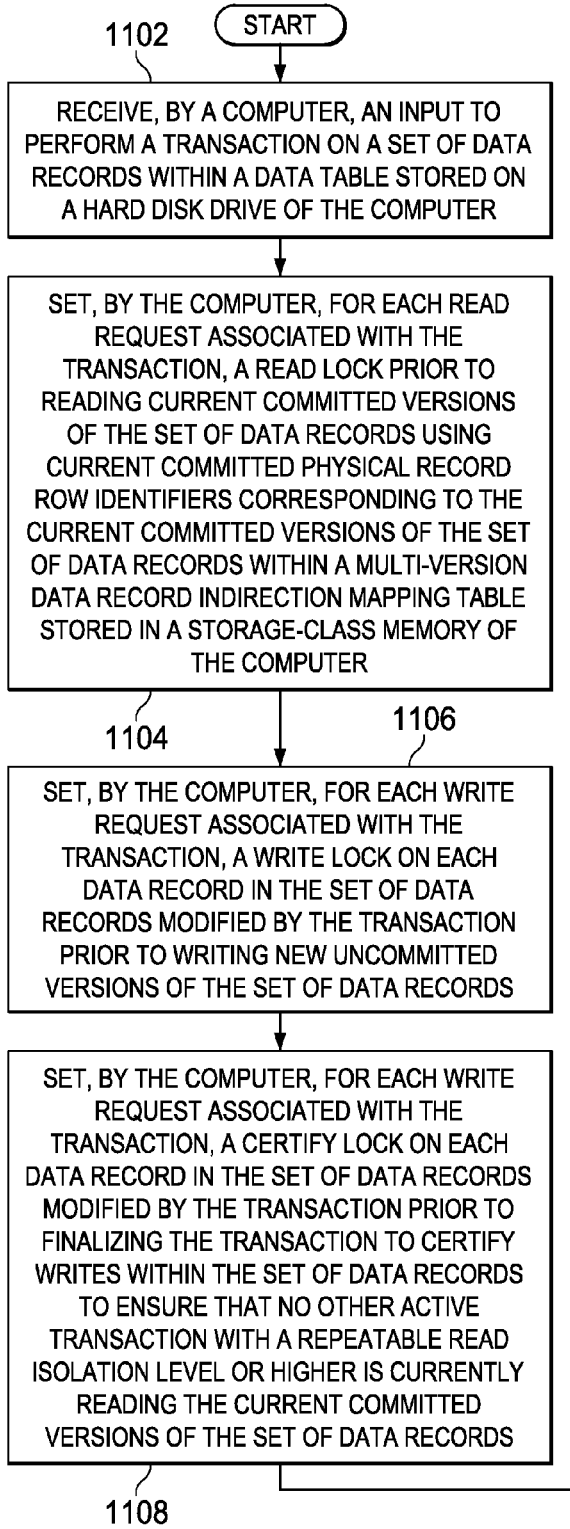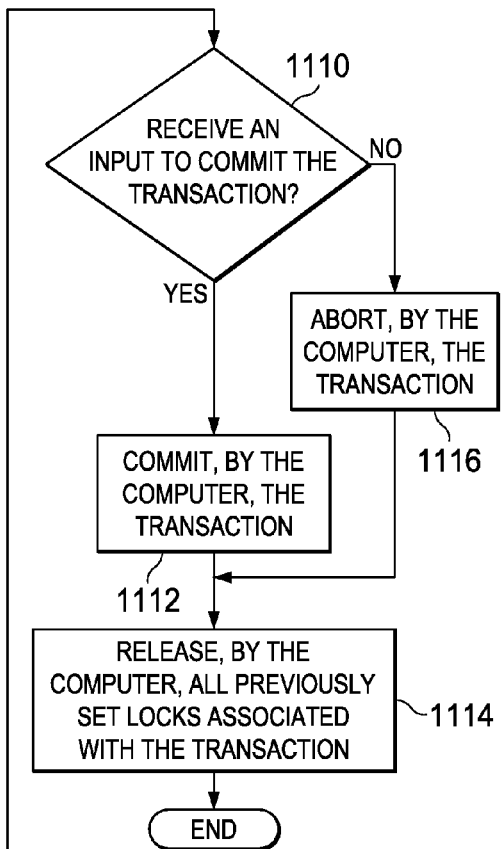
FIG. 11

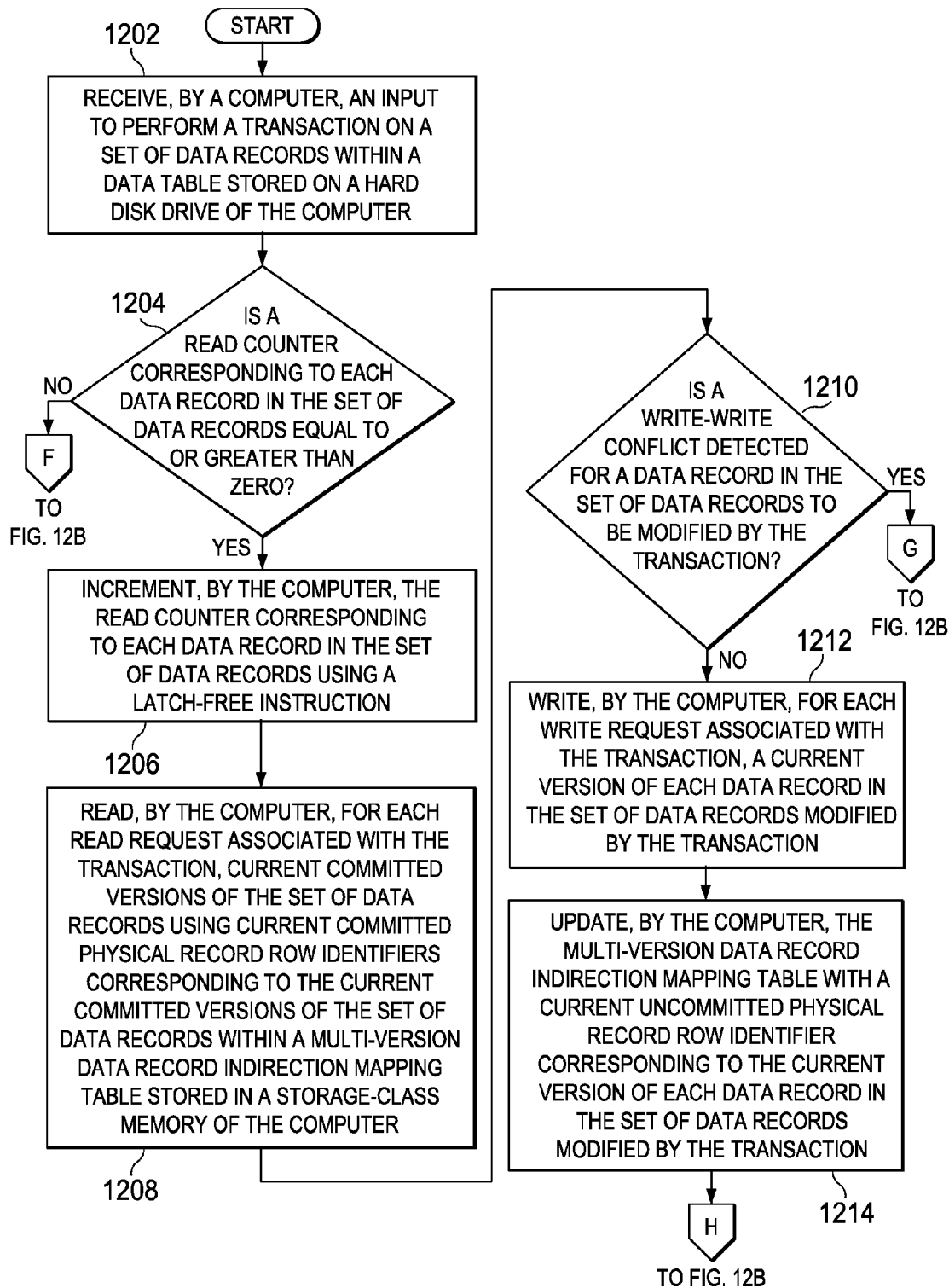

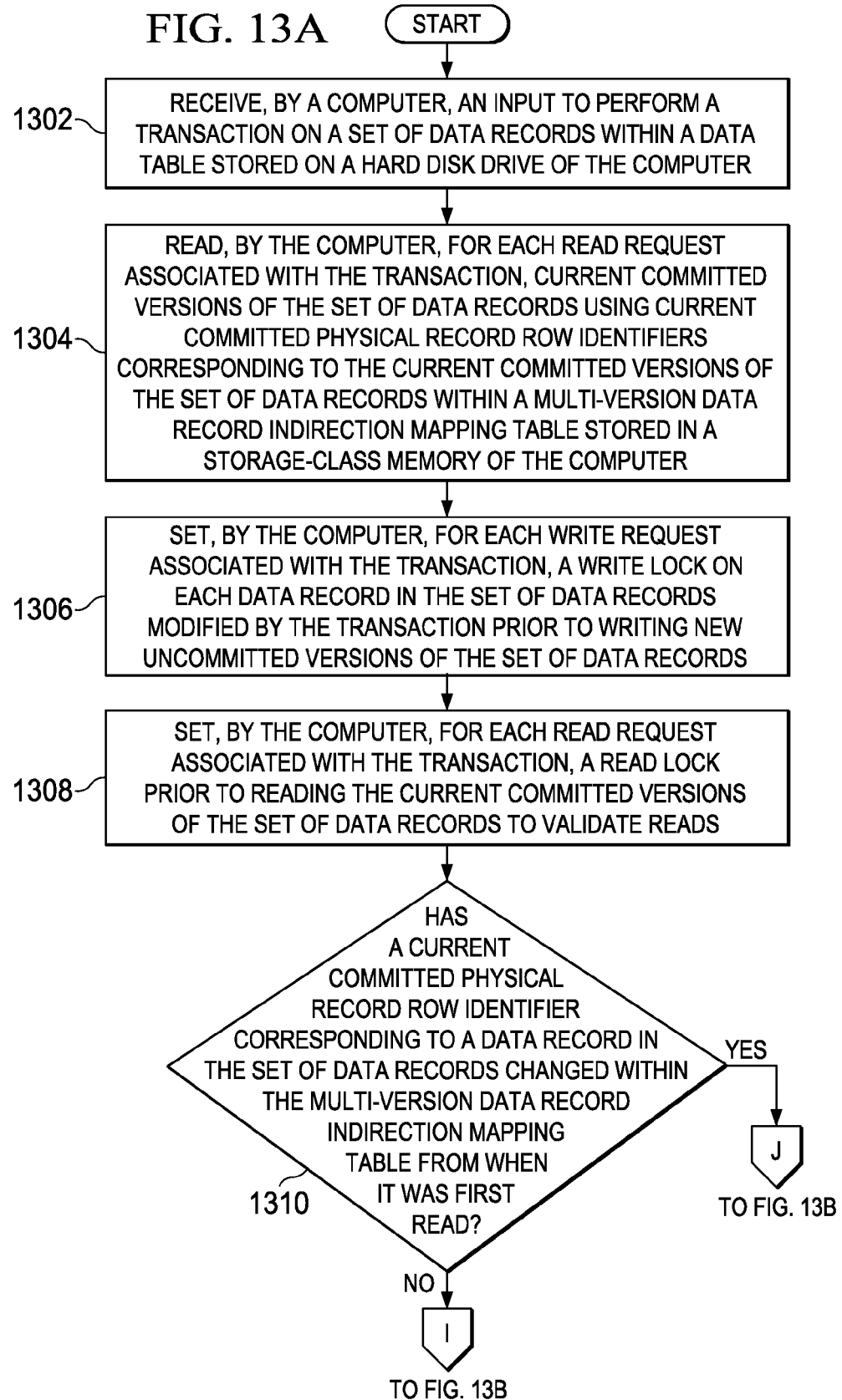

REDUCING DATABASE LOCKING CONTENTION USING MULTI-VERSION DATA RECORD CONCURRENCY CONTROL

BACKGROUND

1. Field

The disclosure relates generally to managing a multi-version database and more specifically to reducing database locking contention using multi-version data record concurrency control within the multi-version database.

2. Description of the Related Art

A multi-version database stores both current data records and historical data records in rows of a relational data table. The rows are typically annotated with timestamps representing the time period during which a row is valid or was valid. In a multi-version database system, new data records do not physically replace old ones. Instead, a new version of a data record is generated, which becomes visible to other transactions at commit time. Conceptually, many rows for a data record may exist, each row corresponding to a state of the multi-version database at some point in time. Older versions of data records may be garbage-collected as the need for the older versions diminishes, in order to reclaim space for new data records.

In a multi-version database, updates and deletions of data records require appending a new data record into the data table rather than performing in-place updates. These operations incur non-negligible performance overhead when multiple indexes on the data table exist and the record changes need to be propagated to these indexes. In a conventional multi-version database, performing a delete operation on a data record requires marking of the row's entry in each of the existing indexes. Any update that changes only one attribute of a data record causes a new version of the row, which needs to be propagated to all of the existing indexes. Hence, index updates will be unavoidable for these operations.

SUMMARY

According to one illustrative embodiment, a computer-implemented method for managing a multi-version data record database is provided. A computer maintains a mapping between a version-independent logical record identifier and current committed and uncommitted version-dependent physical record row identifiers corresponding to each data record within a plurality of data records of a data table using a multi-version data record indirection mapping table stored in a storage-class memory of the computer. The computer updates entries within leaf pages of an index associated with the data table to point to the version-independent logical record identifier corresponding to a data record instead of pointing to the current committed and uncommitted version-dependent physical record row identifiers corresponding to the data record. The computer reads the current committed version-dependent physical record row identifier corresponding to a particular data record from the multi-version data record indirection mapping table to access a current committed version of the particular data record within the data table while a writer is modifying the particular data record to prevent the writer from blocking access to the current committed version of the particular data record by a reader. The computer writes a new uncommitted version-dependent physical record row identifier corresponding to the particular data record in the multi-version data record indirection mapping table to insert a new uncommitted version of the particular data record within the data table while the reader is reading the current committed version of the particular data record to prevent the reader from blocking modification of the particular data record by the writer. According to other illustrative embodiments, a computer system and a computer program product for managing a multi-version data record database also are provided.

BRIEF DESCRIPTION OF THE SEVERAL VIEWS OF THE DRAWINGS

FIG. 5 is a diagram illustrating a lock mode compatibility comparison chart in accordance with an illustrative embodiment;

FIG. 6 is a flowchart illustrating a process for managing a multi-version data record database in accordance with an illustrative embodiment;

FIGS. 7A-7B are a flowchart illustrating a process for searching data records in a relational data table using a multi-version indirection mapping table in accordance with an illustrative embodiment;

FIGS. 8A-8B are a flowchart illustrating a process for updating data records in a relational data table using a multi-version data record indirection mapping table in accordance with an illustrative embodiment;

FIGS. 9A-9B are a flowchart illustrating a process for inserting data records in a relational data table using a multi-version data record indirection mapping table in accordance with an illustrative embodiment;

FIGS. 10A-10B are a flowchart illustrating a process for deleting data records in a relational data table using a multi-version data record indirection mapping table in accordance with an illustrative embodiment;

FIG. 11 is a flowchart illustrating a process for pessimistic two-version two-phase locking (2V2PL) using a multi-version data record indirection mapping table in accordance with an illustrative embodiment;

FIGS. 12A-12B are a flowchart illustrating a process for latch-free pessimistic two-version two-phase locking using a multi-version data record indirection mapping table in accordance with an illustrative embodiment;

FIGS. 13A-13B are a flowchart illustrating a process for optimistic two-version two-phase locking using a multi-version data record indirection mapping table in accordance with an illustrative embodiment.

DETAILED DESCRIPTION

Figure 1:
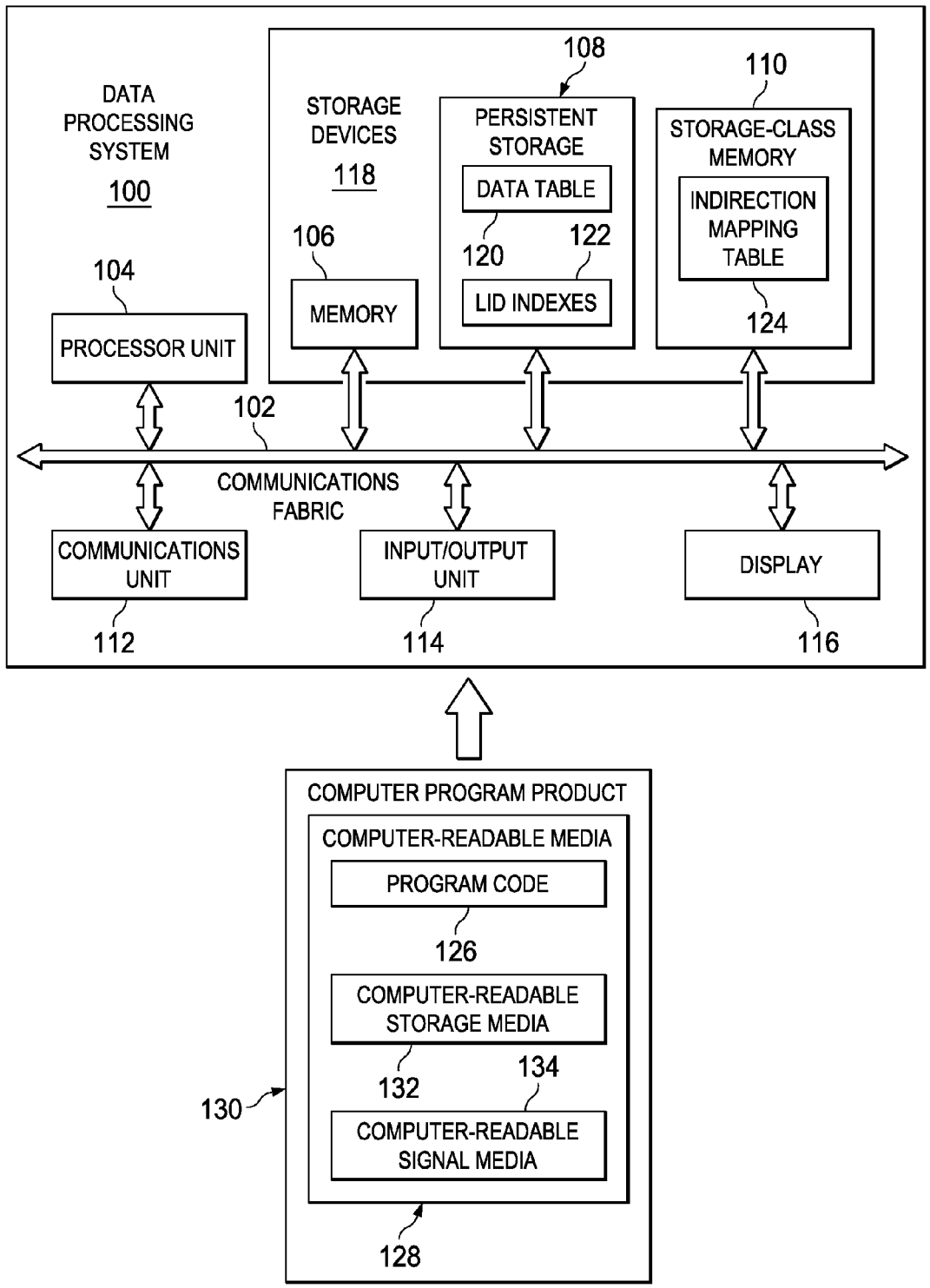
FIG. 1 is a diagram of a data processing system in which illustrative embodiments may be implemented.

As will be appreciated by one skilled in the art, aspects of the illustrative embodiments may be embodied as a computer system, computer-implemented method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer-implemented methods, computer systems, and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a diagram of a data processing system is depicted in accordance with an illustrative embodiment. Data processing system 100 is an example of a computer device in which computer readable program code or instructions implementing processes of illustrative embodiments may be located. Data processing system 100 may be, for example, a server computer or a client computer connected to a network, such as a local area network (LAN), a wide area network (WAN), an intranet, an internet, or the Internet. In this illustrative example, data processing system 100 includes communications fabric 102, which provides communications between processor unit 104, memory 106, persistent storage 108, storage-class memory 110, communications unit 112, input/output (I/O) unit 114, and display 116.

Processor unit 104 serves to execute instructions for software applications or programs that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of computer readable storage devices 118. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 106, in these examples, may be, for example, a random access memory, or any other suitable volatile or non-volatile storage device. Persistent storage 108 may take various forms, depending on the particular implementation. For example, persistent storage 108 may contain one or more devices. For example, persistent storage 108 may be a magnetic hard disc drive (HDD), a flash memory, a rewritable optical disk, a rewritable magnetic tape, or some combination of the above. The media used by persistent storage 108 may be removable. For example, a removable hard disc drive may be used for persistent storage 108.

In this example, persistent storage 108 stores data table 120 and logical record identifier (LID) indexes 122. However, it should be noted that persistent storage 108 may store any type of data, application, program, or module that may be utilized by different illustrative embodiments. Data table 120 may be, for example, a relational data table that stores a plurality of data records in rows and columns. The data records may represent any type of data. For example, the data records may be associated with a financial firm that is required to retain any changes made to client information for up to five years in accordance with auditing regulations or may be associated with a bank that needs to retroactively correct an error in calculating interest rates paid on different accounts.

Logical record identifier indexes 122 are data indexes corresponding to the plurality of data records stored in data table 120. It should be noted that illustrative embodiments include a logical record identifier index for each column of data records in data table 102. Logical record identifier indexes 122 may have, for example, tree structures that include a plurality of leaf pages or nodes. Logical record identifier indexes 122 store entries for version-independent logical record identifiers for each data record located in particular columns of data table 120. In other words, logical record identifier indexes 122 include a version-independent logical record identifier entry for each data record in a plurality of data records stored in a particular column of data table 120. A version-independent logical record identifier is a record identifier that identifies a particular data record in a particular column of the data table, but does not identify a particular version of that data record. In other words, the version-independent logical record identifier is not dependent upon a particular version within a plurality of different versions of the data record stored in data table 120.

Storage-class memory 110 may be, for example, a phase change memory (PCM) and/or a solid-state drive (SSD). A phase change memory is a non-volatile solid-state data storage memory device employing phase change materials that change between two states, namely an amorphous state and a poly-crystalline state. A solid-state drive uses integrated circuit assemblies as memory to store data persistently. Storage-class memory 110 uses electronic interfaces compatible with memory 106 and persistent storage 108. Storage-class memory 110 has lower access time and less latency than persistent storage 108. Similarly, memory 106 has lower access time and less latency than storage-class memory 110.

In this example, storage-class memory 110 stores indirection mapping table 124. However, it should be noted that storage-class memory 110 may store any type of data that may be utilized by the different illustrative embodiments. Indirection mapping table 124 may be, for example, a hash table that maps a plurality of logical record identifiers to a plurality of physical record row identifiers.

Indirection mapping table 124 may be a two-version indirection mapping table or a multi-version indirection mapping table. A two-version indirection mapping table maps one version-independent logical record identifier to two version-dependent physical record row identifiers (i.e., a committed version-dependent physical record row identifier and an uncommitted version-dependent physical record row identifier). A committed version-dependent physical record row identifier (cRID) is a data record identifier that identifies a physical row location of a current committed version of a particular data record within data table 120. An uncommitted version-dependent physical record row identifier (uRID) is a data record identifier that identifies a physical row location of a current uncommitted version of a particular data record within data table 120. In other words, a version-dependent physical record identifier corresponds to a physical location of a current committed or uncommitted version of a particular data record stored in data table 120. A multi-version indirection mapping table maps one version-independent logical record identifier to two or more version-dependent physical record row identifiers. In other words, indirection mapping table 124 may map one version-independent logical record identifier to two or more version-dependent physical record row identifiers, all of which correspond to a particular data record stored within data table 120.

In addition, indirection mapping table 124 may be, for example, keyed by logical record identifiers for faster look-ups. Logical record identifier indexes 122 point to the logical record identifiers instead of the physical record row identifiers. One possible advantage to this approach is that when performing updating or deleting operations on data records, illustrative embodiments will not propagate the changes to all indexes, but will update indirection mapping table 124 instead.

Further, even though illustrative embodiments may need an extra level of indirection for each data search, the response time of illustrative embodiments is faster and smaller compared to the subsequent magnetic hard disk drive input/output because indirection mapping table 124 is stored on storage-class memory 110. Updates to one column in data table 120 will generate a new version of a row, which will change the version-independent logical record identifier to version-dependent physical record row identifier mapping for that particular row. However, it should be noted that illustrative embodiments will only make modification to the logical record identifier index for the changed column. Similarly, illustrative embodiments handle deletions by generating a null physical record row identifier for the corresponding logical record identifier, without any immediate need for updating leaf pages of the associated column index. Illustrative embodiments may still need to update all column indexes when appending data records to the end or "tail" of data table 120, but illustrative embodiments may batch these updates if there are more data record appends than index-dependent data queries. In an alternative illustrative embodiment, all or a portion of indirection mapping table 124 may be cached in memory 106. However, the alternative illustrative embodiment may log any updates on indirection mapping table 124 cached in memory 106 to ensure persistency.

Communications unit 112, in this example, provides for communication with other data processing systems and computing devices. Communications unit 112 may provide communications through the use of either or both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 100.

Input/output unit 114 allows for the input and output of data with other devices that may be connected to data processing system 100. For example, input/output unit 114 may provide a connection for user input through a keypad, a keyboard, a mouse, and/or some other suitable input device. Display 116 provides a mechanism to display information to a user. In addition, display 116 may provide touch screen capabilities.

Instructions for the operating system, applications, and/or programs may be located in storage devices 118, which are in communication with processor unit 104 through communications fabric 102. In this illustrative example, the instructions are in a functional form on persistent storage 108. These instructions may be loaded into memory 106 for running by processor unit 104. The processes of the different embodiments may be performed by processor unit 104 using computer implemented instructions, which may be located in a memory, such as memory 106. These instructions are referred to as program code, computer usable program code, or computer readable program code that may be read and run by a processor in processor unit 104. The program code, in the different embodiments, may be embodied on different physical computer readable storage devices, such as memory 106 or persistent storage 108.

Program code 126 is located in a functional form on computer readable media 128 that is selectively removable and may be loaded onto or transferred to data processing system 100 for running by processor unit 104. Program code 126 and computer readable media 128 form computer program product 130. In one example, computer readable media 128 may be computer readable storage media 132 or computer readable signal media 134. Computer readable storage media 132 may include, for example, an optical or magnetic disc that is inserted or placed into a drive or other device that is part of persistent storage 108 for transfer onto a storage device, such as a magnetic hard disc drive, that is part of persistent storage 108. Computer readable storage media 132 also may take the form of a persistent storage device, such as a hard drive, a thumb drive, or a flash memory that is connected to data processing system 100. In some instances, computer readable storage media 132 may not be removable from data processing system 100.

Alternatively, program code 126 may be transferred to data processing system 100 using computer readable signal media 134. Computer readable signal media 134 may be, for example, a propagated data signal containing program code 126. For example, computer readable signal media 134 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 126 may be downloaded over a network to persistent storage 108 from another device or data processing system through computer readable signal media 134 for use within data processing system 100. For instance, program code stored in a computer readable storage media in a server data processing system may be downloaded over a network from the server to data processing system 100. The data processing system providing program code 126 may be a server computer, a client computer, or some other device capable of storing and transmitting program code 126.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, persistent storage 108, storage-class memory 110, and computer readable storage media 132 are examples of physical computer readable storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing illustrative embodiments, it was discovered that when indexing data records typically only the most recent version of a data record was indexed, since that version of the data record was most commonly accessed, which reduces the overhead of maintaining older versions of that data record. In such as setting, data record insertions, deletions, and updates on a data table triggered input/output to keep the data record indexes current and up to date. With a traditional index structure, the deletion of a data record required the traversal of each index and the removal of the physical record row identifier (RID) from a leaf page of an index containing an entry for that data record. The update of a data record, such as changing one attribute value of the data record to a different value, generated a new version of the data record triggering a traversal of all indexes to change the physical record row identifier to the new version's physical record row identifier. In addition, in the case of a changed attribute value of a data record, the position of an entry corresponding to the data record in the index may also change. For a newly inserted data record, a new physical record row identifier associated with the data record must be inserted into each index. Further, these indexes may be large, and in aggregate, much too large to fit into a random access memory (RAM) bufferpool. As a result, all of the maintenance operations on these indexes will incur the overhead of physical input/output on the storage device. Consequently, managing a multi-version data record database further increases the cost of index maintenance.

These index maintenance operation overheads have historically been problematic for online transaction processing (OLTP) workloads that are update-intensive. As a result, online transaction processing workloads are often tuned to minimize the number of indexes available. This choice of minimizing the number of available indexes makes it more difficult to efficiently process data queries and to locate data records based on secondary attribute values. These capabilities are often important for operational data stores. For example, it is not uncommon to find tens of indexes to improve analytical and decision-making data queries, even in enterprise resource planning (ERP) scenarios.

Another issue that arises for maintaining indexes during data record updates is the overhead of managing concurrent accesses by different transactions. Relying on traditional locking methods, these concurrent accesses by different transactions result in reader and writer transactions being incompatible and causing blocking. Therefore, as the concurrency increases and resource contention between the readers and writers are increased, which may be partly due to the emerging hardware trend of exponential increase of a processor's core count and increase in the size of main memory, the overall utilization of a data processing system is severally deteriorated. This effect is further magnified when, in addition to typical short data record update transactions, there are long running read-only transactions that hold read locks for extended periods of time, which may cause a database to stall.

The conflict between readers and writers, especially those conflicts associated with long running readers, limits the prospect of single version data record concurrency control. A common method for dealing with this limitation is to relax the consistency model and settle for transaction-inconsistent answers to data record queries or to rely on existing multi-version concurrency control (MVCC) models. However, illustrative embodiments address the limitations of conflicts associated with both short and long running transactions by introducing: 1) a multi-version data record indirection mapping process that transparently extends indexes to implement a two-version two-phase locking (2V2PL) concurrency control model; 2) a cost-effective and simple process that expresses the 2V2PL concurrency control model using an existing single-version two-phase locking (2PL) infrastructure; 3) a latch-free 2V2PL concurrency control model that eliminates transaction blocking and lock wait time; and 4) a parallel and optimistic 2V2PL concurrency control model that reduces the length of time that locks are held and avoids locking resources prior to transferring data records from a slower storage medium to a faster storage medium, which prevents other active transactions from accessing the resources held by waiting for data record transfer.

Illustrative embodiments organize the data records into a single data table, which contains both current data records and historical data records. Illustrative embodiments append new rows to an end or tail of the data table. Data record updates need to read the data table once and write a new version of the data record to the end of the table. Illustrative embodiments focus on applications that primarily use current data records, but occasionally need to access older versions of the data records. To support data queries over current data records, the most recent version of a data record appears in an index entry.

Typically, indexes are defined only on the latest version of records. As a result, in addition to paying the amplified cost of index maintenance, when updating a value of a column in an index that is not yet committed by a transaction, other active transactions are unable to use the index to fetch the most recently committed values for the updated record. In general, in order to support snapshot isolation and/or multi-version concurrency control, either each active transaction is forced to search a database temporary area (e.g., rollback segments) to fetch older versions of desired data records or each transaction is forced to scan the entire data record table to find the older versions of the data records in a multi-version database in the absence of specialized temporal indexes.

Illustrative embodiments utilize a multi-version data record indirection mapping process that supports parallelizable optimistic and pessimistic multi-version concurrency control and utilizes older versions of data records (i.e., at most two versions of each record) to provide direct access to the recent changes of the data records without the need of specialized temporal indexes. Consequently, the multi-version data record indirection mapping process of illustrative embodiments results in a higher degree of concurrency control by reducing conflicts between readers and writers of data records and avoiding extended read lock delays.

Figure 2:
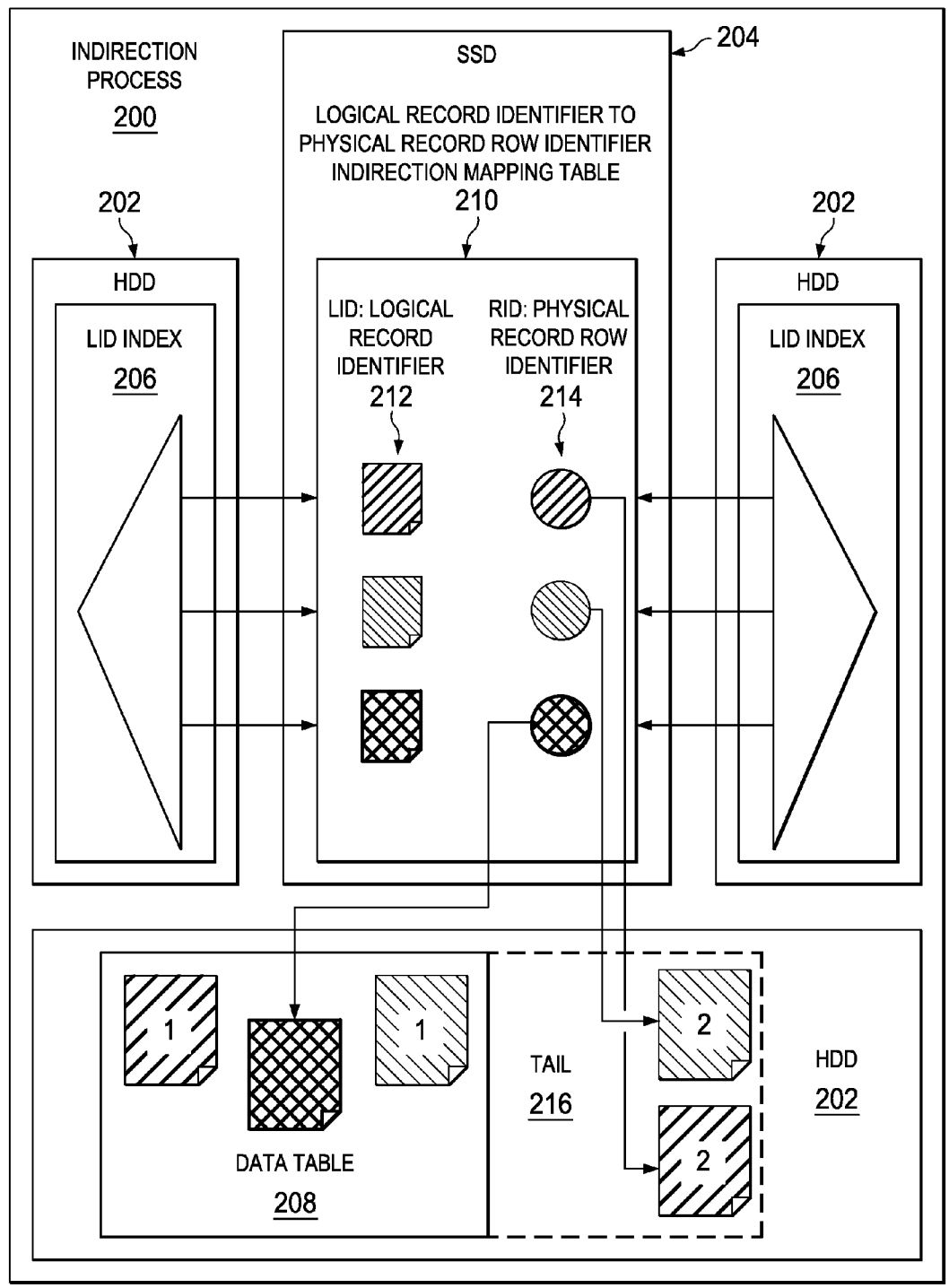
FIG. 2 is a diagram illustrating indirection using an indirection mapping table stored in a solid-state storage device in accordance with an illustrative embodiment.

With reference now to FIG. 2, a diagram illustrating indirection using an indirection mapping table stored in a solid-state storage device is depicted in accordance with an illustrative embodiment. Indirection process 200 may be implemented in a computer, such as data processing system 100 in FIG. 1, for example. Indirection process 200 utilizes hard disk drive 202 and solid-state drive 204. Hard disk drive 202 may be, for example, a magnetic hard disk storage device, such as persistent storage 108 in FIG. 1. Solid-state drive 204 may be, for example, storage-class memory 110 in FIG. 1.

Hard disk drive 202 includes logical record identifier index 206, such as logical record identifier indexes 122 in FIG. 1. Logical record identifier index 206 includes entries corresponding to a plurality of data records within data table 208, which is stored in hard disk drive 202. Data table 208 may be, for example, data table 120 in FIG. 1. Solid-state drive 204 stores logical record identifier to physical record row identifier indirection mapping table 210, such as indirection mapping table 124 in FIG. 1. Logical record identifier to physical record row identifier indirection mapping table 210 includes logical record identifier (LID) 212 and physical record row identifier (RID) 214 for each data record entry in logical record identifier index 206.

Traditional index structures directly reference a data record in data table 208 via physical record row identifier 214 only. Physical record row identifier 214 typically encodes a combination of a database partition identifier, a page number within the partition, and a row number within the page where the data record is stored. However, only using physical record row identifier 214 to reference a data record hinders the update performance of a multi-version database in which updates result in a new physical location for an updated data record. Changes to the data record induce input/output for every index, even indexes on "unaffected" attribute values that have not changed. Random input/outputs are required to modify hard disk drive-resident leaf pages.

To avoid hard disk drive input/output for indexes on unaffected attribute values, indirection process 200 decouples the physical and logical representations of data records spanning a plurality of versions. Indirection process 200 distinguishes between physical record row identifier 214 and logical record identifier 212, which correspond to a particular data record. For any given data record, a plurality of physical record row identifiers may exist for a particular data record. Each of the plurality of physical row identifiers for a particular data record corresponds to a physical location of a different version of that particular data record within the data table.

In contrast, indirection process 200 utilizes logical record identifier 212, which corresponds to one physical record row identifier 214 representing the most recent version of the data record. In addition, indirection process 200 utilizes logical record identifier 212 as a primary key in logical record identifier to physical record row identifier indirection mapping table 210. As a result, indirection process 200 may now reference version-independent logical record identifiers within indexes stored in hard disk drive 202 rather than referencing version-dependent physical record row identifiers in leaf pages of the indexes.

Indirection process 200 utilizes logical record identifier to physical record row identifier indirection mapping table 210 stored in solid-state drive 204 to convert logical record identifier 212 to physical record row identifier 214 during a traversal of logical record identifier index 206 stored in hard disk drive 202. Indirection process 200 treats a missing logical record identifier or a logical record identifier with a corresponding null physical record row identifier in logical record identifier to physical record row identifier indirection mapping table 210 as a deleted row and ignores these entries during a search for data records. By placing logical record identifier to physical record row identifier indirection mapping table 210 on solid-state drive 204, indirection process 200 ensures that the input/output overhead for the extra indirection is relatively small. Because solid-state drive 204 is a persistent storage device, logical record identifier to physical record row identifier indirection mapping table 210 can be recovered after a computer crash. Further, because indirection process 200 only needs a few solid-state drive bytes per data record, it is possible to handle a large magnetic disk drive footprint with a much smaller solid-state drive footprint.

When an existing data record is modified, a new version of that data record is generated. Consequently, indirection process 200 updates logical record identifier to physical record row identifier indirection mapping table 210 to associate the physical record row identifier for the new row in data table 208 containing the new version of the data record to the existing logical record identifier corresponding to that data record. As a result, indexes on unchanged attribute values remain valid. Thus, indirection process 200 only requires index input/output for the changed attribute value.

When a data record is deleted, indirection process 200 deletes the logical record identifier/physical record row identifier pair for that particular data record from logical record identifier to physical record row identifier indirection mapping table 210. Index traversals ignore missing logical record identifiers. Indexes may update their leaf pages during traversal, when a read input/output is performed. At that time, when missing logical record identifiers are encountered, indirection process 200 removes those logical record identifiers from the index leaf pages. After a long period of activity, indexes should be validated offline against logical record identifier to physical record row identifier indirection mapping table 210 to remove deleted logical record identifiers that subsequently have not been searched for.

When a new data record is added, indirection process 200 appends or adds the new data record to tail 216 of data table 208. Then, indirection process 200 determines the physical record row identifier associated with the location of the new data record within tail 216 and associates the determined physical record row identifier with a newly generated logical record identifier that corresponds to the new data record. Indirection process 200 also adds the logical record identifier/physical record row identifier pair for the new data record to logical record identifier to physical record row identifier indirection mapping table 210. In addition, indirection process 200 updates logical record identifier index 206 with the new logical record identifier corresponding to the new data record.

Figure 3:
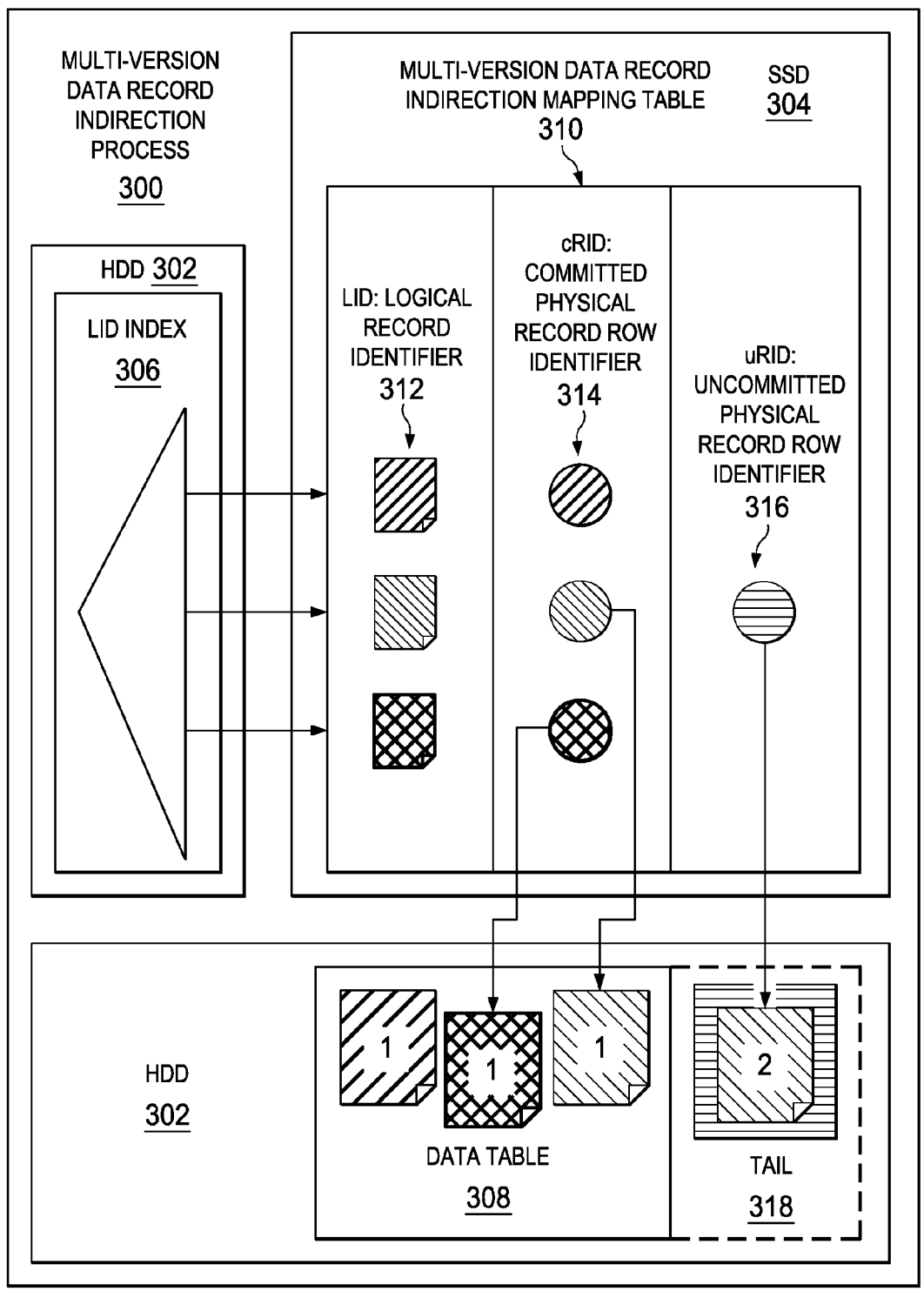
FIG. 3 is a diagram illustrating a multi-version data record indirection process in accordance with an illustrative embodiment.

With reference now to FIG. 3, a diagram illustrating a multi-version data record indirection process is depicted in accordance with an illustrative embodiment. Multi-version data record indirection process 300 may be implemented in a computer, such as data processing system 100 in FIG. 1, for example. Multi-version data record indirection process 300 utilizes hard disk drive 302 and solid-state drive 304. Hard disk drive 302 may be, for example, a magnetic hard disk storage device, such as persistent storage 108 in FIG. 1. Solid-state drive 304 may be, for example, storage-class memory 110 in FIG. 1.

Hard disk drive 302 includes logical record identifier index 306, such as logical record identifier index 206 in FIG. 2. Logical record identifier index 306 includes entries corresponding to data records within data table 308, which is stored in hard disk drive 302. Solid-state drive 304 stores multi-version data record indirection mapping table 310. Multi-version data record indirection mapping table 310 may be, for example, indirection mapping table 124 in FIG. 1. Multi-version data record indirection mapping table 310 includes a column for a logical record identifier (LID), a current committed physical record row identifier (cRID), and a current uncommitted physical record row identifier (uRID), such as logical record identifier 312, committed physical record row identifier 314, and uncommitted physical record row identifier 316, which correspond to each data record entry in logical record identifier index 306. In other words, multi-version data record indirection mapping table 310 includes an LID, cRID, and uRID value set for each data record within data table 308.

Tail 318 is a portion or segment of data table 308 that is located at an end of data table 308. Tail 318 is an append only section of data table 308. Multi-version data record indirection process 300 stores current committed and uncommitted versions of data records in an append only fashion within tail 318. Older versions of data records are accessible through data table 308. As a result, multi-version data record indirection process 300 does not need roll-back segments or temporary spaces.

Multi-version data record indirection process 300 decouples the logical and physical location of data records through indirection mapping. Multi-version data record indirection process 300 may differentiate between up to a predetermined number (k) of committed versions and one (1) uncommitted version of each data record through multi-version data record indirection mapping table 310. By decoupling committed and uncommitted versions of data records, multi-version data record indirection process 300 avoids conflicts between readers reading currently committed data records and writers writing newly updated or inserted data records, without changing the semantics or structure of the indexes. For clarity, in this example multi-version data record indirection process 300 only illustrates one committed version and one uncommitted version of a particular data record within multi-version data record indirection mapping table 310.

In multi-version data record indirection mapping, or in two-version data record indirection mapping with a deadline of only two versions of each data record, multi-version data record indirection process 300 generates a cRID for the currently committed version of each data record and generates a uRID for the currently outstanding uncommitted version of each data record. The (LID, cRID, uRID) triplet for a particular data record represents a conceptual and logical connection. As a result, the (LID, cRID, uRID) triplet does not dictate that multi-version data record indirection mapping table 310 must be physically extended to pre-allocate enough space for the uRID, but rather multi-version data record indirection mapping table 310 may maintain the uRID only for an active set of transactions to reduce space overhead.

A subtly arises when combining indexes with two-version data record indirection mapping. For example, suppose multi-version data record indirection process 300 updates a data record on a column particular column of data table 308, where an index is also defined on that particular column. Now whenever multi-version data record indirection process 300 changes a data record value for that particular column, then multi-version data record indirection process 300 associates both the old value and the new value of that particular column to the data record's LID. This association allows readers to detect that both the old and new values are referring to the same data record due to the common LID and also provides an option of reading either committed or uncommitted values of the data record from the index. From the index leaf page, multi-version data record indirection process 300 can easily determine whether the value and LID pair is committed or uncommitted with the use of a single bit to indicate whether an index entry is committed or not.

Through two-version data record indirection mapping, concurrent readers are able to access the currently committed versions of each data record within data table 308 using the cRID, without interfering with concurrent writers. Similarly, concurrent writers are able to insert an updated uncommitted version of a data record using the uRID, without blocking concurrent readers. By placing a reference to an uncommitted version of each data record in multi-version data record indirection mapping table 310, multi-version data record indirection process 300 also enables readers to speculatively read an uncommitted version of a data record and ignore the committed version or vice versa. Consequently, multi-version data record indirection mapping table 310 seamlessly allows access to multiple versions of a data record without changing the underlying index structure.

With 8-byte LIDs, 8-byte cRIDs, and 8-byte uRIDs, multi-version data record indirection process 300 needs 24 bytes per database row. Multi-version data record indirection process 300 may compress this 24 byte size to less than half, since LIDs tend to have many leading zeroes and techniques exist for compressing RIDs. In addition, if multi-version data record indirection process 300 partitions data table 308 into a set of smaller tables, then a 4-byte cRID and 4-byte uRID may be sufficient. Alternatively, if multi-version data record indirection process 300 assigns the number of LIDs consecutively starting from one using, for example, the original RID of the data record, multi-version data record indirection process 300 may omit the LID entirely and use data record position within data table 308 as a surrogate for the LID. Even without any of the above-mentioned schemes to reduce the size of multi-version data record indirection mapping table 310, if a base table with a 240-byte row is assumed, then multi-version data record indirection mapping table 310 roughly amounts to only 10% of the base table footprint.

As discussed above, the two-version data record indirection mapping table only includes the cRID of the most recently committed version of a data record and the uRID of the most recently uncommitted version of that same data record. The two-version data record indirection mapping table is keyed by the LID (e.g., as a hash table) to enable fast lookups to both the cRID and the uRID. Indexes no longer point to RIDs, but instead to LIDs so that each index now indirectly points to different versions of the same data record (i.e., a committed version of the data record (cRID) and an uncommitted version of the data record (uRID)). This two-version data record indirection mapping table allows a user to select the right version of a data record based on the transaction concurrency control, whether the user requires a committed or uncommitted version of that particular data record.

An update to one column creates a new version of a row by the updating transaction and adds the new uncommitted RID value (uRID) to the two-version data record indirection mapping table for the updated data record. All other concurrent transactions when searching through indexes will read the current committed version of the data record and not the uncommitted version. Thus, the other concurrent transactions always follow the cRID pointers, unless the transaction concurrency control allows an uncommitted read, which two-version data record indirection mapping also supports. At the time of committing data record updates, multi-version data record indirection process 300 copies the current uRID value into the cRID column and sets a NULL value in the uRID column. In addition, multi-version data record indirection process 300 removes old values associated with the old cRID value from the affected indexes. Furthermore, multi-version data record indirection process 300 does not modify or update indexes on unaffected columns. If a transaction aborts, then multi-version data record indirection process 300 simply sets the corresponding uRID value to NULL within the uRID column of the two-version data record indirection mapping table and removes the new key added to the affected indexes. However it should be noted that because the old key remains in the affected indexes and the cRID value is still valid in the two-version data record indirection mapping table, multi-version data record indirection process 300 does not need to re-insert the old cRID value into the table, which is another benefit of two-version data record indirection mapping.

Figure 4:
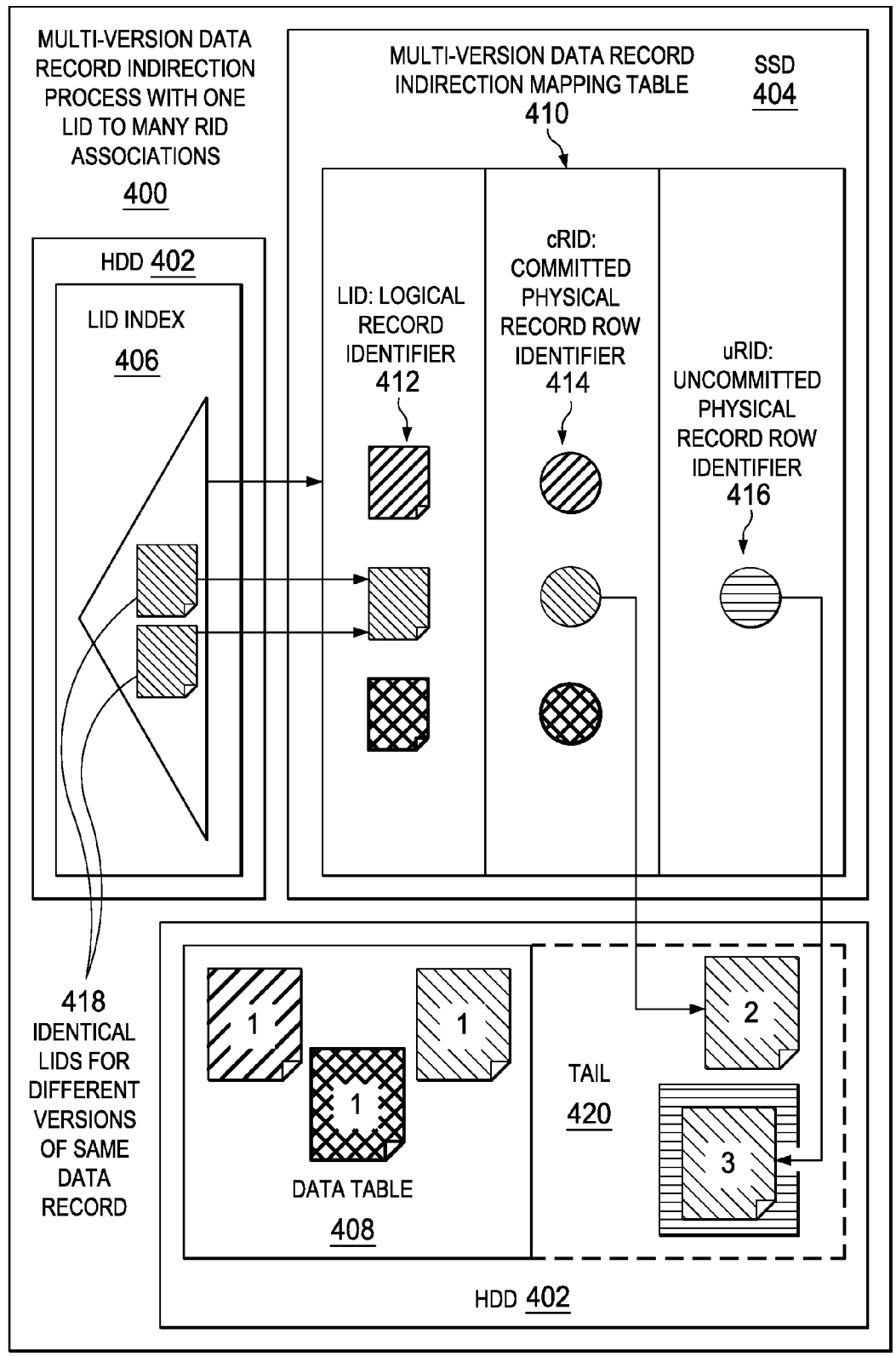
FIG. 4 is a diagram illustrating a multi-version data record indirection process with one logical record identifier to many physical record row identifiers in accordance with an illustrative embodiment.

With reference now to FIG. 4, a diagram illustrating a multi-version data record indirection process with one logical record identifier to many physical record row identifiers is depicted in accordance with an illustrative embodiment. Multi-version data record indirection process with one LID to many RID associations 400 may be implemented in a computer, such as data processing system 100 in FIG. 1, for example. Multi-version data record indirection process with one LID to many RID associations 400 utilizes hard disk drive 402 and solid-state drive 404. Hard disk drive 402 may be, for example, hard disk drive 302 in FIG. 3. Solid-state drive 404 may be, for example, solid-state drive 304 in FIG. 3.

Hard disk drive 402 includes logical record identifier index 406, such as logical record identifier index 306 in FIG. 3. Logical record identifier index 406 includes entries corresponding to data records within data table 408, which is stored in hard disk drive 402. Solid-state drive 404 stores multi-version data record indirection mapping table 410. Multi-version data record indirection mapping table 410 may be, for example, indirection mapping table 124 in FIG. 1. Multi-version data record indirection mapping table 410 includes a column for logical record identifier (LID) 412, committed physical record row identifier (cRID) 414, and uncommitted physical record row identifier (uRID) 416. Identical LIDs for different versions of same data record 418 represents logical record identifiers that correspond to the same data record. For example, one LID in identical LIDs for different versions of same data record 418 corresponds to a committed version of a data record (cRID) and the other LID corresponds to an uncommitted version of that same data record (uRID).

Tail 420 is located at an end of data table 408. Tail 420 is an append only portion of data table 408. In this example, multi-version data record indirection process with one LID to many RID associations 400 stores a current committed version of a particular data record and an uncommitted version of that same data record within tail 420.

Multi-version data record indirection process with one LID to many RID associations 400 implements the concurrency control protocol using two-version data record indirection mapping and extends the exiting commercial database lock manager based on two-phase locking (2PL) to effectively model two-version two-phase locking (2V2PL). Two-phase locking is a concurrency control protocol that guarantees serializability in databases and transaction processing. Two-phase locking applies locks and removes locks in two phases. In the first phase, locks are acquired and no locks are released. In the second phase, locks are released and no locks are acquired.

Multi-version data record indirection process with one LID to many RID associations 400 implements the concurrency control protocol with respect to various standard read isolation levels. The standard read isolation levels may be, for example: 1) a read uncommitted isolation level that ensures no lost data record updates, but data record reads may be uncommitted (e.g., dirty reads are possible); 2) a read committed isolation level that ensures no lost data record updates and data record reads are committed (e.g., reads are not repeatable); 3) a repeatable read isolation level that ensures no lost data record updates and reads are repeatable (e.g., phantom data record reads are possible); and 4) a serializable read isolation level that ensures no lost data record updates, data record reads are repeatable, and no phantom reads are possible. In this example, the read isolation levels are listed with increasing levels of read constraints. For example, level 1 has the lowest level of read constraints, whereas level 4 has the highest level of read constraints ensuring that data records are 100% correct.

In addition, multi-version data record indirection process with one LID to many RID associations 400 visits the different read isolation levels in the context of both: 1) pessimistic concurrency control that validates all the data record reads in parallel during a transaction; and 2) optimistic concurrency control that validates all the data record reads in parallel only before committing a transaction. Further, multi-version data record indirection process with one LID to many RID associations 400 determines whether the concurrency control relies on locking (blocking) or non-locking (non-blocking). What is common among these listed variations is that by retaining older versions of a data record (e.g., a non-snapshot isolation level only requires the last committed and the last uncommitted version of a data record), multi-version data record indirection process with one LID to many RID associations 400 avoids conflicts between the readers and writers of the data record as the level of concurrency and contention increases.

The pessimistic 2V2PL concurrency control model avoids conflicts between readers and writers by ensuring that only readers certify their reads prior to committing. For example, when a reader reads a particular data record, a read lock is set prior to reading the current committed version of that particular data record. The current version of the particular data record is read from the cRID column of the two-version data record indirection mapping table. For phantom data record read detection, a range-predicate of a read/select query is registered or a next-key locking process is employed.

When a writer writes a new version of a particular data record, the new version is inserted by setting a write lock prior to modifying the particular data record (i.e., writing a new uncommitted version of that particular data record). When certifying writes in parallel, a certify lock is set on each data record in a data record writeset that was modified by the transaction prior to finalizing the transaction to ensure that no other active transaction with a repeatable read isolation level or higher is currently reading current versions of data records in the writeset. The write certification also is extended to satisfy the registered range-predicates of the read/select query. When committing the transaction, all previously set locks, such as read and write locks, are released.

The parallel implementation of the pessimistic 2V2PL concurrency control model is conflict-free at the serializable read isolation level. This directly follows the fact that every transaction history produced by the pessimistic 2V2PL concurrency control model is at the serializable read isolation level. In addition, the implementation of the pessimistic 2V2PL concurrency control model using two-version data record indirection mapping does not change its semantics or the order in which things are completed.

Supporting read committed semantics using the pessimistic 2V2PL concurrency control model is straight forward following a standard 2PL protocol for cursor stability. For example, the pessimistic 2V2PL concurrency control model releases the read locks as soon as the data records are read in the reading phase of a transaction. For uncommitted data record reads, the pessimistic 2V2PL concurrency control model does not acquire any read locks prior reading the uncommitted data records.

The latch-free or non-blocking pessimistic 2V2PL concurrency control model is implemented using an atomic compare-and-swap (CAS) operator. Compare-and-swap is an atomic instruction used in multiple transaction processing to achieve synchronization. Compare-and-swap compares the contents of a memory location to a given value and, only if they are the same, modifies the contents of that memory location to the given new value. This is done as a single atomic operation. The atomicity guarantees that the new value is calculated based on up-to-date information. If the value is updated by another transaction in the meantime, the write fails.

When a reader reads a particular data record, if a read counter associated with that particular data record is equal to or greater than zero (0), then the read counter is incremented using a latch-free instruction, such as a CAS operator, prior to reading the current version of that particular data record. The current cRID value of that particular data record is read from the cRID column of the two-version data record indirection mapping table. If the read counter associated with the particular data record is less than zero, then the read fails and the transaction is aborted and rolled back.

When a writer writes a new version of a particular data record, the new version is inserted by detecting a write-write conflict for the particular data record. A write-write conflict is detected prior to modifying the particular data record. If no conflict is detected a new uncommitted version of the particular data record is written and the uRID value in the uRID column of the two-version data record indirection mapping table is updated accordingly. The value of the uRID, itself, is an indicator of a write-write conflict. For example, a NULL value for the uRID means that no other active transaction is currently changing or modifying that particular data record. Conversely, a non-NULL value for the uRID means that the particular data record is already being changed by another transaction.

When certifying writes in parallel, every data record in the writeset is certified prior to finalizing the transaction to ensure that no other active transaction with a repeatable read isolation level or higher is currently reading the current versions of the data records. Certification is satisfied if a read counter is equal to zero for each data record in the writeset. If the read counters are equal to zero, then the writes are certified and the read counters are set to minus one (−1), which indicate that the data records in the writeset are in the process of certification and that their read counters cannot be incremented. If a read counter for one of the data records in the writeset is not equal to zero, then the write cannot be certified and the transaction is aborted and rolled back.

After a transaction is committed, then the incremented read counters for data records in the readset are decremented and the corresponding uRIDs values of data records in the writeset are set to NULL in the uRID column of the two-version data record indirection mapping table. The latch-free pessimistic 2V2PL concurrency control model is conflict-free at the serializable read isolation level. The latch-free pessimistic 2V2PL concurrency control model is based on the read counter process, which essentially prevents any write operations on data records read by active transactions. As a result, the certification process is always satisfied. Consequently, the latch-free pessimistic 2V2PL concurrency control model with the read counter process for selected reads is at the serializable read isolation level.

The latch-free pessimistic 2V2PL concurrency control model with the write-write conflict process also is at the serializable read isolation level because the model simply aborts and avoids queuing transactions when it is determined that a transaction's data record writeset is being changed by other active transactions. Because the only modification to the latch-free pessimistic 2V2PL concurrency control model is to abort certain transactions, there are no lost data record updates. The latch-free pessimistic 2V2PL concurrency control model certification phase guarantees that the version read by the transaction remains unchanged throughout the life of transaction. The point is to ensure that certification, itself, is done in a critical section, meaning that once the latch-free pessimistic 2V2PL concurrency control model certifies a data record in the writeset, the latch-free pessimistic 2V2PL concurrency control model does not admit any new readers to that data record. This is achieved by setting the read counter of each data record in the writeset to minus one (−1) if the read counters are equal to zero (0). If a read counter of a data record in the writeset is greater than zero, then the certification phase fails and the latch-free pessimistic 2V2PL concurrency control model aborts the transaction in order to ensure read stability for active transactions without blocking the certifying transaction. As a result, all transaction histories produced by the latch-free pessimistic 2V2PL concurrency control model are at the serializable read isolation level.

Similar to the blocking pessimistic 2V2PL concurrency control model, supporting read committed semantics using the latch-free (i.e., non-blocking) pessimistic 2V2PL concurrency control model also is straight forward. For example, for committed data record reads, the latch-free pessimistic 2V2PL concurrency control model decrements the read counters of data records as soon as the data records are read in the reading phase of a transaction. For uncommitted data record reads, the latch-free pessimistic 2V2PL concurrency control model does not increment any read counter prior to reading uncommitted data records. It should be noted that illustrative embodiments may fit a data record read counter as part of an 8 byte pointer associated with a uRID within a two-version data record indirection mapping table.

The optimistic 2V2PL concurrency control model is only relevant for the higher read isolation levels when validation is needed, namely, for repeatable reads and serializability. The read committed isolation level always reads the committed version of a data record and does not require validation. Further, illustrative embodiments focus on repeatable reads and not on phantom data record read detection required for the serializable read isolation level.

To implement the optimistic 2V2PL concurrency control model, illustrative embodiments rely on two-version data record indirection mapping, which provides a faster process during the validation phase. Illustrative embodiments require a transaction to track only the LID and cRID corresponding to a data record that was read during the read phase of the transaction. Illustrative embodiments also drop the need for holding read locks for the data record readset during the read phase of the transaction. During the final certify/validation phase of the transaction, a transaction re-fetches the current LID and cRID pairs associated with the data record readset from the two-version data record indirection mapping table and also acquires read locks on the data record readset during this final stage. If the cRID has not changed for any of the data records in the readset, then the transaction satisfies the validation phase and continues on with the rest of the certification phase of the optimistic 2V2PL concurrency control model where the read locks acquired during the validation phase are released after the certification phase is completed. If either the cRID of any of the data records in the readset has changed or the read locks on the data record readset cannot be acquired due to a certify lock already being held on the data record readset by another active transaction, then the current transaction is aborted.

Illustrative embodiments may utilize one of two different alternative approaches when dealing with phantom data record read detection. The first approach is based on a standard technique of repeating the entire read range scan during the validation phase, instead of just validating each data record in the readset. The second approach relies on a range-predicate phantom read detection process or a key-range locking process, in which when read range scans are submitted, a predicate that covers the entire read/select query range is also issued. As a result, all data record writes during the certify phase must be validated against the relevant read range predicates. This process essentially extends the certification phase to include the range-predicate validation process to prevent phantom data record reads.

Illustrative embodiments may perform the validation phase in parallel because the two-version data record indirection mapping table includes all the necessary information to complete the validation phase. In addition, illustrative embodiments maintain the two-version data record indirection mapping table on a faster storage medium, such as, for example, main memory or storage-class memory, which supports random data record accesses. Once the transaction is ready to commit, at which point the entire data record readset is known, then illustrative embodiments verify the data record readset using two-version data record indirection mapping in parallel. Consequently, illustrative embodiments decrease the time required for the validation phase and reduce the time needed to maintain the data record read locks, which further reduces the contention between concurrent transactions. Because illustrative embodiments know the data record readset at the end of the transaction, illustrative embodiments may also utilize a batching technique to acquire read locks on data records in bulk. Further, because illustrative embodiments hold locks during the final certification/validation phase of the transaction, where data records most likely reside in main memory or even in a processor cache, illustrative embodiments use minimal lock duration times and never hold a lock while transferring data records from a slower storage medium to a faster storage medium.

Using the optimistic 2V2PL concurrency control model, when a reader reads a particular data record, illustrative embodiments read the current version of that particular data record using the cRID value in the cRID column of the two-version data record indirection mapping table. For phantom data record read detection, a range-predicate of a read/select query is registered. When a writer writes a new version of a particular data record, illustrative embodiments insert the new version by setting a write lock prior to modifying the particular data record (i.e., writing a new uncommitted version of the particular data record).

When validating data record reads, illustrative embodiments set a read lock prior to reading the current version of a data record in the readset. Illustrative embodiments read the current cRID value corresponding to the data record from the cRID column of the two-version data record indirection mapping table. For each data record in the readset, if its cRID value has not changed from when the data record was first read, then the validation phase is satisfied.

When certifying a data record write, illustrative embodiments set a certify lock prior to finalizing the transaction on the particular data record that was modified by the transaction in order to ensure that no other active transaction with a repeatable read isolation level or higher is currently reading the current version of that particular data record. Illustrative embodiments also extend the write certification phase to satisfy the registered range-predicates of the read/select query. When committing the transaction, illustrative embodiments release all previously set locks, such as read and write locks.

The optimistic 2V2PL concurrency control model is conflict-free at the serializable read isolation level. The optimistic 2V2PL concurrency control model has a validation phase guarantee that the data record version read by the transaction remains unchanged throughout the entire lifetime of that particular transaction. The point is to ensure that validation, itself, is done in a critical section, meaning that once a data record in the readset is validated, no other active transactions can change the data record until the validation phase is completed. This is achieved by holding a read lock for every data record in the readset prior to validating the readset in parallel and releasing the read lock for every data record in the readset after the transaction is committed. As a result, all transaction histories produced by the optimistic 2V2PL concurrency control model are at a serializable read isolation level. Supporting committed/uncommitted data record read semantics for the optimistic 2V2PL concurrency control model is achieved by not requiring validation of committed/uncommitted data record reads prior to committing the transaction.

The latch-free or non-blocking optimistic 2V2PL concurrency control model is implemented using the atomic compare-and-swap (CAS) operator. When a reader reads a particular data record, illustrative embodiments read the current version of that particular data record using the cRID value in the cRID column of the two-version data record indirection mapping table. For phantom data record read detection, a range-predicate of the read/select query is registered.

When a writer writes a new version of a particular data record, illustrative embodiments insert the new version by detecting a write-write conflict for the particular data record. Illustrative embodiments determine whether a write-write conflict exists prior to modifying the particular data record. If no conflict is detected a new uncommitted version of the particular data record is written and the uRID value in the uRID column of the two-version data record indirection mapping table is updated accordingly. The value of the uRID, itself, is an indicator of a write-write conflict. For example, a NULL value for the uRID means that no other active transaction is currently changing or modifying that particular data record. Conversely, a non-NULL value for the uRID means that the particular data record is already being changed.

When validating reads in parallel, for each data record in the readset, if a data record's read counter is equal to or greater than zero, then illustrative embodiments increment the read counter prior to reading the current version of that data record. Illustrative embodiments read the current cRID value of that data record from the cRID column of the two-version data record indirection mapping table. For each data record in the readset, if a data record's corresponding cRID value in the cRID column of the two-version data record indirection mapping table has not changed from when the data record was first read, then the validation phase is satisfied. If the data record's read counter is less than zero, then the validation phase fails and the transaction is rolled back.

When certifying writes in parallel, every data record in the writeset is certified prior to finalizing the transaction to ensure that no other active transaction with a repeatable read isolation level or higher is currently reading the current versions of the data records. The certification phase is satisfied if a read counter is equal to zero for each data record in the writeset. If the read counters are equal to zero, then the data record writes are certified and the read counters are set to minus one (−1), which indicate that the data records in the writeset are in the process of certification and that their read counters cannot be incremented. If a read counter for one of the data records in the writeset is not equal to zero, then the data record writes cannot be certified and the transaction is aborted and rolled back.

After the transaction is committed, the incremented read counters for data records in the readset are decremented and the corresponding uRIDs of data records in the writeset are set to NULL in uRID column of the two-version data record indirection mapping table. The latch-free optimistic 2V2PL concurrency control model is conflict-free at the serializable read isolation level. The latch-free optimistic 2V2PL concurrency control model is based on the read counter process, which essentially prevents any write operations on data records read by other active transactions. As a result, the certification phase is always satisfied. Consequently, the latch-free optimistic 2V2PL concurrency control model with the read counter process for selected data record reads is at the serializable read isolation level.

The latch-free optimistic 2V2PL concurrency control model with the write-write conflict process also is at the serializable read isolation level because the model simply aborts and avoids queuing transactions when it is determined that a transaction's data record writeset is being changed by other active transactions. Since the only modification to the latch-free optimistic 2V2PL concurrency control model is to abort certain transactions, then there are no lost data record updates and subsequently all transaction histories produced by the latch-free optimistic 2V2PL concurrency control model are at the serializable read isolation level.

Furthermore, the latch-free optimistic 2V2PL concurrency control model has a validation phase guarantee that the data record version read by the transaction remains unchanged throughout the entire lifetime of that particular transaction. The only point is to ensure that validation, itself, is done in a critical section, meaning that once a data record in the readset is validated, no other active transactions can change the data record until the validation phase is completed. This is achieved by holding a read lock for every data record in the readset prior to validating the readset in parallel and releasing the read lock for every data record in the readset after the transaction is committed. As a result, all transaction histories produced by the latch-free optimistic 2V2PL concurrency control model are at a serializable read isolation level. Supporting committed/uncommitted data record read semantics for the latch-free optimistic 2V2PL concurrency control model is achieved by not requiring validation of data record reads prior to committing transactions.

The blocking versions of the pessimistic and optimistic 2V2PL concurrency control models may co-exist because both models rely on a lock manager. The only difference between the models is when the lock manager acquires locks, but, nevertheless, appropriate locks, including certification locks, which the lock manager must acquire. The situation is slightly more complex when non-blocking transactions are included as well.

First, consider the case of mixing latch-free pessimistic and optimistic transactions. Both models respect how data record read counters are incremented, ensure that there are at most one outstanding write for each data record, and always certify writes. The only difference between the two models is that data record read counters are incremented at the beginning of a transaction for the pessimistic approach to transactions, while the data record read counters are incremented at the end of a transaction for the optimistic approach to transactions. Therefore, it is easy to see how the latch-free pessimistic and optimistic 2V2PL concurrency control models for transactions can co-exist.

However, the co-existence of blocking and non-blocking (i.e., latch-free) 2V2PL concurrency control models for transactions is non-trivial, irrespective of whether the models are pessimistic or optimistic. Because blocking transactions rely on the lock manager and the lock manager's queuing capability, while non-blocking transactions altogether bypass the lock manager, a gap is created between the execution of the blocking and non-blocking models. In other words, there is no obvious mechanism to enable coordination between blocking and non-blocking transactions. For example, certain applications may require a blocking feature and expect the database to manage conflicting transaction, as opposed to simply aborting such transactions and returning the transactions to the user.

Illustrative embodiments utilize a light-weight coordination process based on a two-version data record indirection mapping table and a lock manager to enable the co-existence of both blocking and non-blocking 2V2PL concurrency control models for transactions. First, illustrative embodiments require that blocking transactions increment data record read counters in addition to acquiring read locks. Depending on whether illustrative embodiments utilize the pessimistic or optimistic approach, the data record read counters may be incremented either at the beginning of a transaction or at the end of a transaction, respectively. If a read counter cannot be incremented due to certification of an outstanding data record write by a non-blocking (i.e., latch-free) transaction, then the blocking transaction acquires a wait-for dependency on the non-blocking data record writer transaction. Data record writes for blocking transactions also must detect a possible write-write conflict using the uRID column of the two-version data record indirection mapping table and acquire a wait-for dependency using the lock manager. Therefore, illustrative embodiments may support the mix of blocking and non-blocking of both the pessimistic and optimistic 2V2PL concurrency control models to co-exist for transactions.

With reference now to FIG. 5, a diagram illustrating a lock mode compatibility comparison chart is depicted in accordance with an illustrative embodiment. Lock mode compatibility comparison chart 500 compares two-phase locking (2PL) lock scheme 502 and two-version two-phase locking (2V2PL) lock scheme 504. Illustrative embodiments implement the 2V2PL concurrency control within existing commercial database systems based on the 2PL concurrency control.

Existing 2PL lock managers include two main locks, such as, for example, shared locks and exclusive locks. Shared locks are used for reading data records and may be shared across different transactions. Exclusive locks are used for writing data records and prevent other transactions from reading or writing the locked data records. In addition, most commercial database systems have an update lock, which is intended for data record writing, but the update lock does not actually allow for the changing of data records. Prior to changing the data records, the update lock must first be promoted to an exclusive lock.

This 2PL lock scheme 502 characterization fits into 2V2PL lock scheme 504 by mapping read locks to shared locks, write locks to update locks, and certify locks to exclusive locks. In addition, illustrative embodiments also may relax the update lock constraint allowing the transaction that holds the data record update to physically change the data record. Using lock mode compatibility comparison chart 500 mapping, illustrative embodiments may efficiently transform a commercial database system with a single-version data record concurrency control to a multi-version data record concurrency control with minimal changes to the commercial database system.

With reference now to FIG. 6, a flowchart illustrating a process for managing a multi-version data record database is shown in accordance with an illustrative embodiment. The process shown in FIG. 6 may be implemented in a computer, such as, for example, data processing system 100 in FIG. 1.

The process begins when the computer maintains a mapping between a version-independent logical record identifier and current committed and uncommitted version-dependent physical record row identifiers corresponding to each data record within a plurality of data records of a data table using a multi-version data record indirection mapping table stored in a storage-class memory of the computer (step 602). In addition, the computer updates entries within leaf pages of an index associated with the data table to point to the version-independent logical record identifier corresponding to a data record instead of pointing to the current committed and uncommitted version-dependent physical record row identifiers corresponding to the data record (step 604).

Further, the computer reads the current committed version-dependent physical record row identifier corresponding to a particular data record from the multi-version data record indirection mapping table to access a current committed version of the particular data record within the data table while a writer is modifying the particular data record to prevent the writer from blocking access to the current committed version of the particular data record by a reader (step 606). The computer also writes a new uncommitted version-dependent physical record row identifier corresponding to the particular data record in the multi-version data record indirection mapping table to insert a new uncommitted version of the particular data record within the data table while the reader is reading the current committed version of the particular data record to prevent the reader from blocking modification of the particular data record by the writer (step 608). Furthermore, the computer writes the new uncommitted version-dependent physical record row identifier corresponding to the particular data record in the multi-version data record indirection mapping table to insert the new uncommitted version of the particular data record within the data table while one of a plurality of writers has yet to write an uncommitted value to the particular data record to resolve write-write conflict between the plurality of writers without utilizing locking (step 610).

Moreover, the computer updates the multi-version data record indirection mapping table in response to performing one of an insert, update, or delete operation on the particular data record instead of updating the entries within the leaf pages of the index associated with the data table (step 612). In addition, the computer validates previously read data records using the multi-version data record indirection mapping table for optimistic multi-version data record concurrency control (step 614). Thereafter, the process terminates.

Figure 7B:
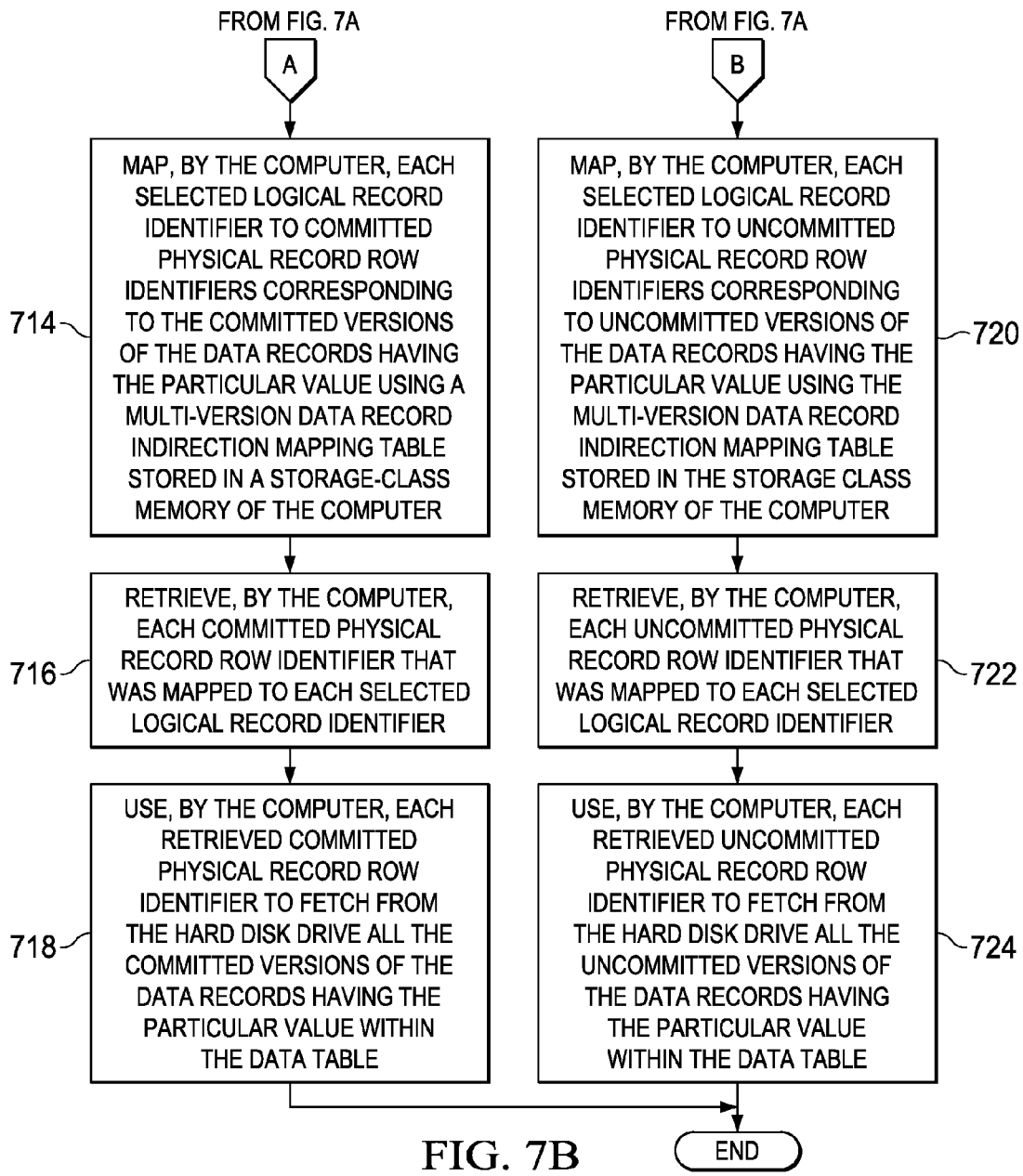

With reference now to FIGS. 7A-7B, a flowchart illustrating a process for searching data records in a relational data table using a multi-version indirection mapping table is shown in accordance with an illustrative embodiment. The process shown in FIGS. 7A-7B may be implemented in a computer, such as, for example, data processing system 100 in FIG. 1.

The process begins when the computer receives an input to search all data records having a particular value associated with a particular column of a data table stored on a hard disk drive of the computer (step 702). Afterward, the computer searches the hard disk drive for a logical record identifier index associated with the particular column of the data table (step 704). In addition, the computer traverses leaf pages of the logical record identifier index associated with the particular column of the data table for entries having the particular value (step 706).

Subsequently, the computer makes a determination as to whether any leaf pages within the logical record identifier index associated with the particular column of the data table include an entry having the particular value (step 708). If the computer determines that leaf pages within the logical record identifier index associated with the particular column of the data table do not include an entry having the particular value, no output of step 708, then the process terminates thereafter. If the computer determines that leaf pages within the logical record identifier index associated with the particular column of the data table do include an entry having the particular value, yes output of step 708, then the computer selects each logical record identifier within a leaf page of the logical record identifier index associated with the particular column of the data table having the particular value (step 710).

Afterward, the computer makes a determination as to whether this search operation is for committed versions of the data records having the particular value associated with the particular column of the data table (step 712). If the computer determines that this search operation is for committed versions of the data records having the particular value associated with the particular column of the data table, yes output of step 712, then the computer maps each selected logical record identifier to committed physical record row identifiers corresponding to the committed versions of the data records having the particular value using a multi-version data record indirection mapping table stored in a storage class memory of the computer (step 714). Further, the computer retrieves each committed physical record row identifier that was mapped to each selected logical record identifier (step 716). Furthermore, the computer uses each retrieved committed physical record row identifier to fetch from the hard disk drive all the committed versions of the data records within the data table having the particular value (step 718). Thereafter, the process terminates.

Returning again to step 712, if the computer determines that this search operation is for uncommitted versions of the data records having the particular value associated with the particular column of the data table, no output of step 712, then the computer maps each selected logical record identifier to uncommitted physical record row identifiers corresponding to uncommitted versions of the data records having the particular value using the multi-version data record indirection mapping table stored in the storage class memory of the computer (step 720). The computer also retrieves each uncommitted physical record row identifier that was mapped to each selected logical record identifier (step 722). In addition, the computer uses each retrieved uncommitted physical record row identifier to fetch from the hard disk drive all the uncommitted versions of the data records within the data table having the particular value (step 724). Thereafter, the process terminates.

Figure 8A:
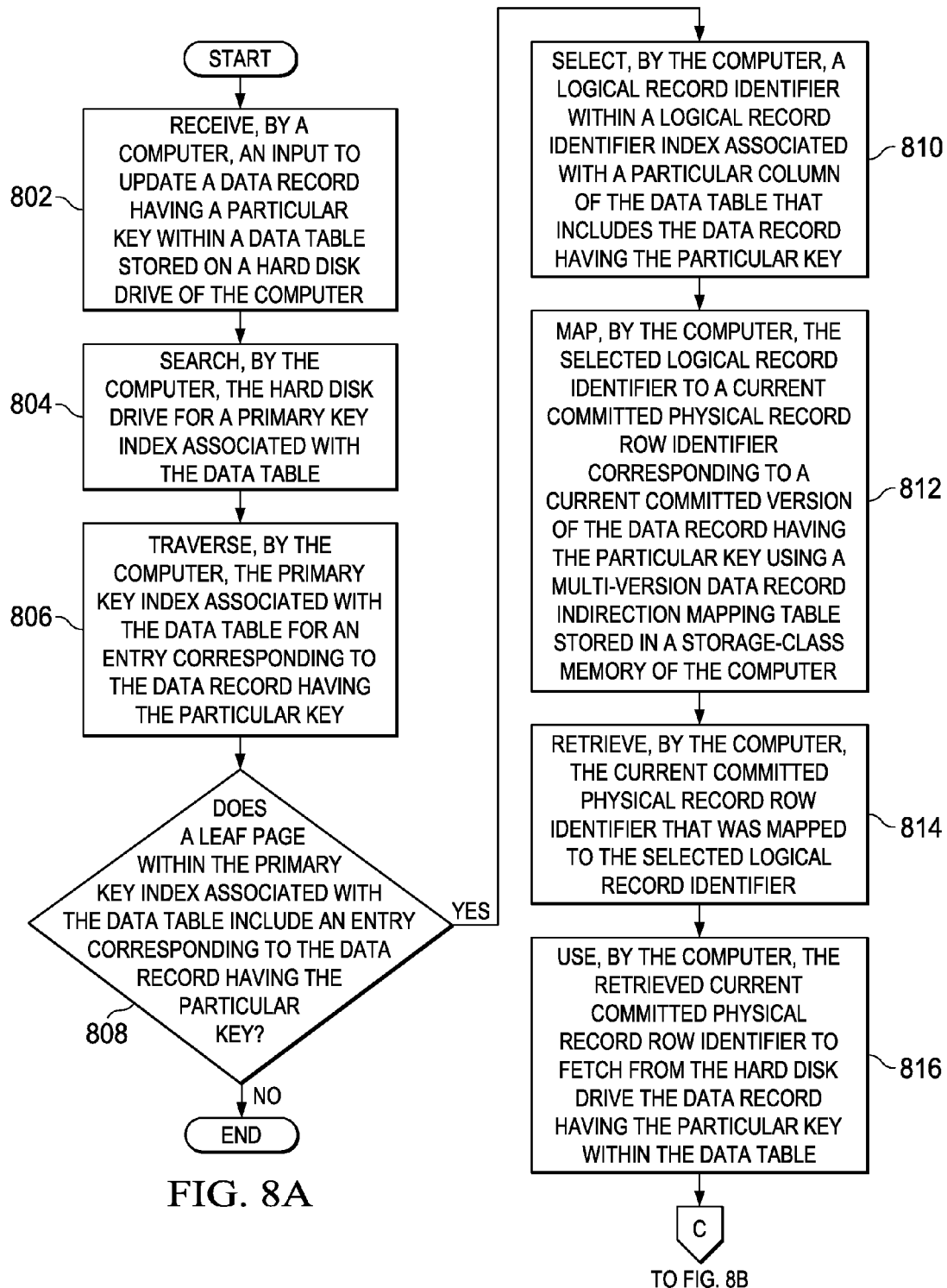

With reference now to FIGS. 8A-8B, a flowchart illustrating a process for updating data records in a relational data table using a multi-version data record indirection mapping table is shown in accordance with an illustrative embodiment. The process shown in FIGS. 8A-8B may be implemented in a computer, such as, for example, data processing system 100 in FIG. 1.

The process begins when the computer receives an input to update a data record having a particular key within a data table stored on a hard disk drive of the computer (step 802). Afterward, the computer searches the hard disk drive for a primary key index associated with the data table (step 804). Then, the computer traverses the primary key index associated with the data table for an entry corresponding to the data record having the particular key (step 806). Subsequently, the computer makes a determination as to whether a leaf page within the primary key index associated with the data table includes an entry corresponding to the data record having the particular key (step 808).

If the computer determines that no leaf pages within the primary key index associated with the data table include an entry corresponding to the data record having the particular key, no output of step 808, then the process terminates thereafter. If the computer determines that a leaf page within the primary key index associated with the data table does include an entry corresponding to the data record having the particular key, yes output of step 808, then the computer selects a logical record identifier within a logical record identifier index associated with a particular column of the data table that includes the data record having the particular key (step 810). In addition, the computer maps the selected logical record identifier to a current committed physical record row identifier corresponding to a current committed version of the data record having the particular key using a multi-version data record indirection mapping table stored in a storage-class memory of the computer (step 812).

Afterward, the computer retrieves the current committed physical record row identifier that was mapped to the selected logical record identifier (step 814). Then, the computer uses the retrieved current committed physical record row identifier to fetch from the hard disk drive the data record having the particular key within the data table (step 816). Further, the computer generates a new version of the data record having the particular key based on the received input updating the data record (step 818).

Subsequently, the computer changes a value associated with the particular column of the data table that includes the new version of the data record from a first value to a second value associated with the particular column (step 820). In addition, the computer places the new version of the data record in a location at an end of the data table (step 822). Furthermore, the computer determines a current uncommitted physical record row identifier corresponding to the location at the end of the data table where the new version of the data record was placed (step 824).

Then, the computer updates an entry in the multi-version data record indirection mapping table with the determined current uncommitted physical record row identifier corresponding to the location of the new version of the data record using the selected logical record identifier (step 826). The computer also traverses the logical record identifier index for the second value associated with the particular column to insert an entry corresponding to the new version of the data record having the particular key within the leaf page (step 828). In addition, the computer traverses the logical record identifier index for the first value associated with the particular column to remove an entry corresponding to the data record having the particular key from the leaf page after transaction commit (step 830).

Further, the computer sets a current committed physical record row identifier corresponding to the data record within the multi-version data record indirection mapping table to the determined current uncommitted physical record row identifier corresponding to the location of the new version of the data record (step 832). Furthermore, the computer sets the determined current uncommitted physical record row identifier to null (step 834). Thereafter, the process terminates.

Figure 9B:
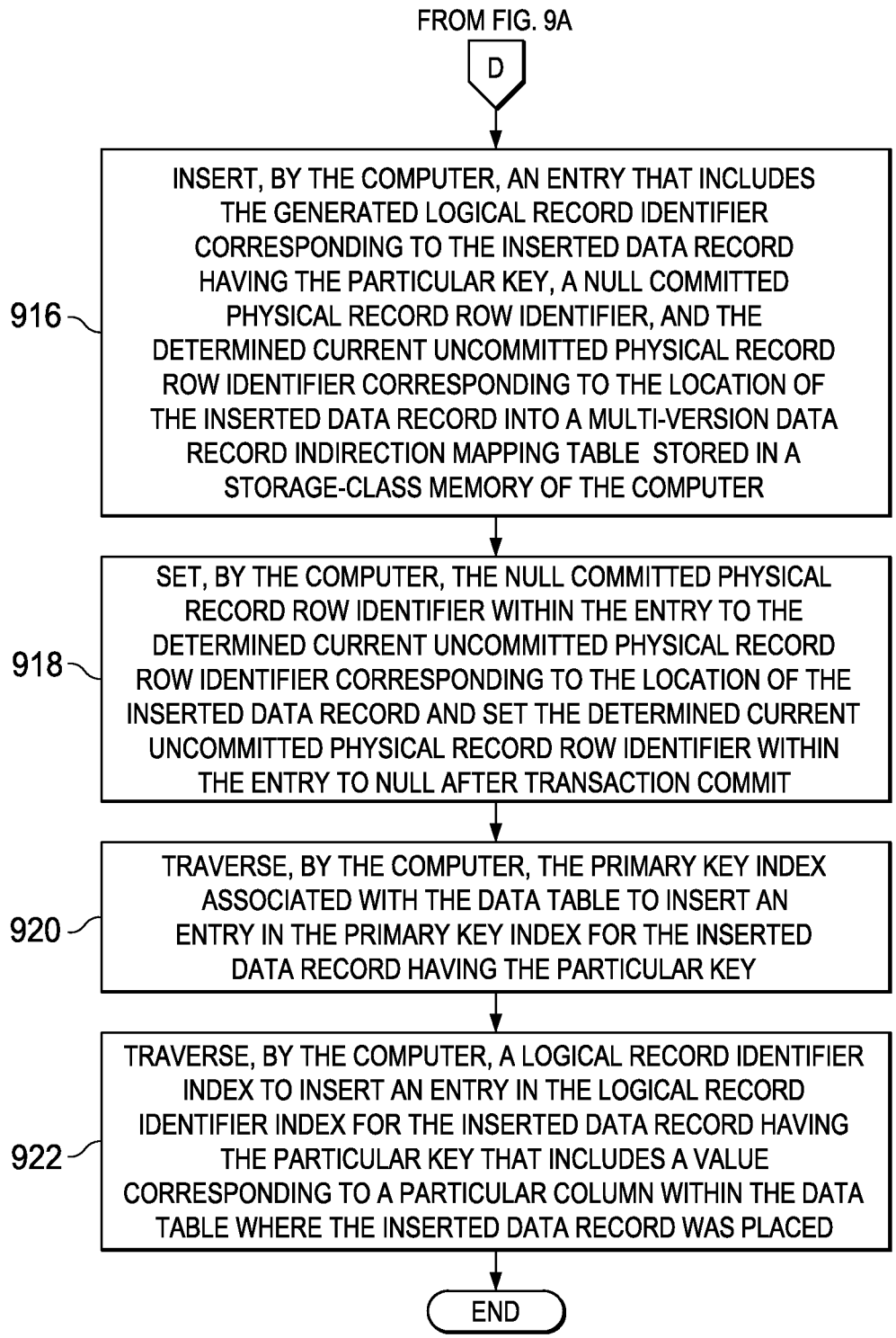

With reference now to FIGS. 9A-9B, a flowchart illustrating a process for inserting data records in a relational data table using a multi-version data record indirection mapping table is shown in accordance with an illustrative embodiment. The process shown in FIGS. 9A-9B may be implemented in a computer, such as, for example, data processing system 100 in FIG. 1.

The process begins when the computer receives an input to insert a data record having a particular key into a data table stored on a hard disk drive of the computer (step 902). Afterward, the computer searches the hard disk drive for a primary key index associated with the data table (step 904). Then, the computer traverses the primary key index associated with the data table for an entry corresponding to the data record having the particular key (step 906). Subsequently, the computer makes a determination as to whether a leaf page within the primary key index associated with the data table includes an entry corresponding to the data record having the particular key (step 908).

If the computer determines that a leaf page within the primary key index associated with the data table does include an entry corresponding to the data record having the particular key, yes output of step 908, then the process terminates thereafter. If the computer determines that no leaf pages within the primary key index associated with the data table include an entry corresponding to the data record having the particular key, no output of step 908, then the computer inserts the data record having the particular key in a location at an end of the data table based on the received input to insert the data record (step 910). In addition, the computer determines a current uncommitted physical record row identifier corresponding to the location at the end of the data table where the inserted data record having the particular key was placed (step 912).

Further, the computer generates a logical record identifier corresponding to the inserted data record having the particular key (step 914). The computer also inserts an entry that includes the generated logical record identifier corresponding to the inserted data record having the particular key, a null committed physical record row identifier, and the determined current uncommitted physical record row identifier corresponding to the location of the inserted data record into a multi-version data record indirection mapping table stored in a storage-class memory of the computer (step 916). In addition, the computer sets the null committed physical record row identifier within the entry to the determined current uncommitted physical record row identifier corresponding to the location of the inserted data record and set the determined current uncommitted physical record row identifier within the entry to null after transaction commit (step 918).

Then, the computer traverses the primary key index associated with the data table to insert an entry in the primary key index for the inserted data record having the particular key (step 920). In addition, the computer traverses a logical record identifier index to insert an entry in the logical record identifier index for the inserted data record having the particular key that includes a value corresponding to a particular column within the data table where the inserted data record was placed (step 922). Thereafter, the process terminates.

Figure 10B:
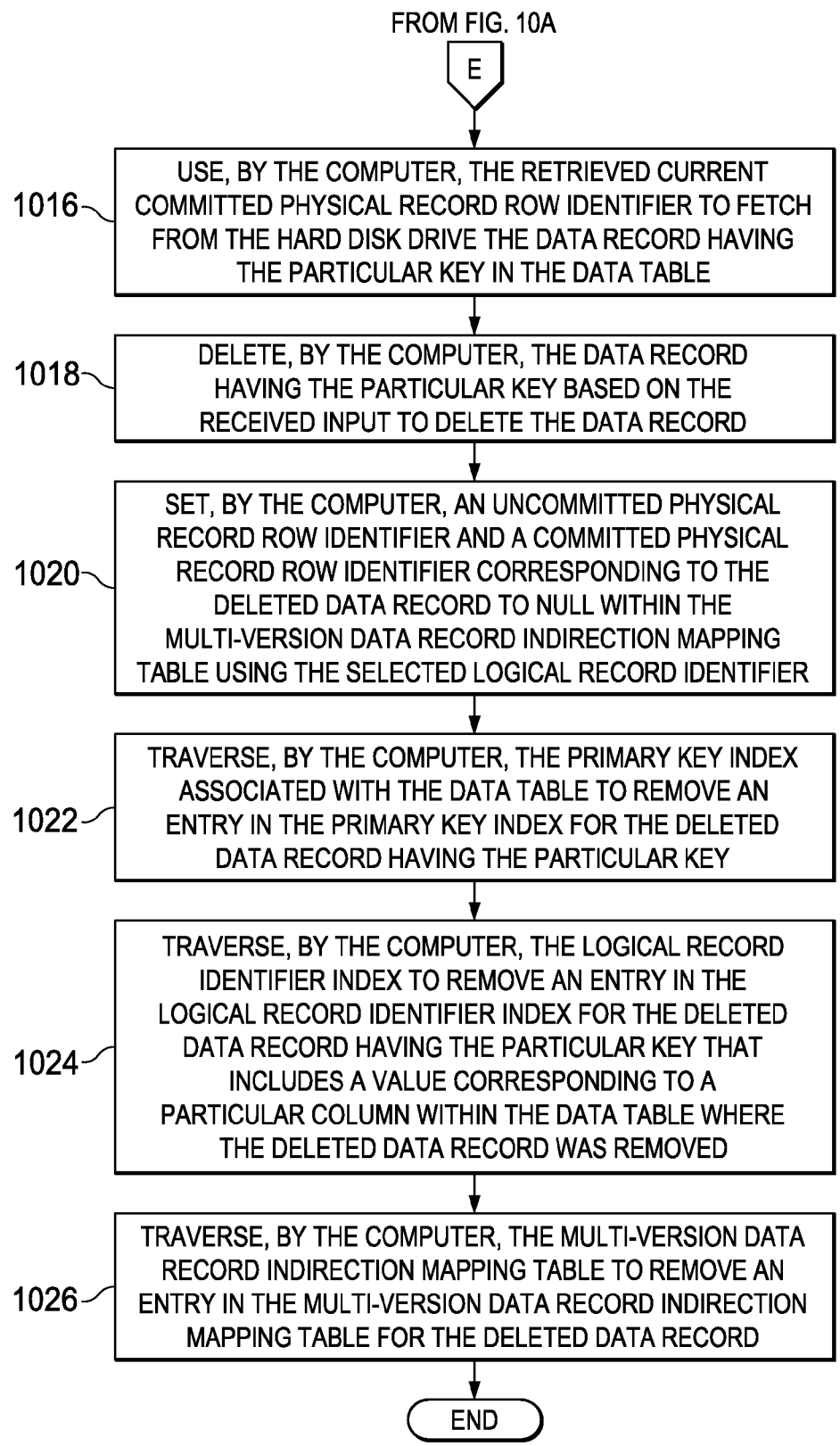

With reference now to FIGS. 10A-10B, a flowchart illustrating a process for deleting data records in a relational data table using a multi-version data record indirection mapping table is shown in accordance with an illustrative embodiment. The process shown in FIGS. 10A-10B may be implemented in a computer, such as, for example, data processing system 100 in FIG. 1.

The process begins when the computer receives an input to delete a data record having a particular key from a data table stored on a hard disk drive of the computer (step 1002). Afterward, the computer searches the hard disk drive for a primary key index associated with the data table (step 1004). Then, the computer traverses the primary key index associated with the data table for an entry corresponding to the data record having the particular key (step 1006). Subsequently, the computer makes a determination as to whether a leaf page within the primary key index associated with the data table includes an entry corresponding to the data record having the particular key (step 1008).

If the computer determines that no leaf pages within the primary key index associated with the data table include an entry corresponding to the data record having the particular key, no output of step 1008, then the process terminates thereafter. If the computer determines that a leaf page within the primary key index associated with the data table does include an entry corresponding to the data record having the particular key, yes output of step 1008, then the computer selects a logical record identifier within a logical record identifier index associated with a particular column of the data table that includes the data record having the particular key (step 1010). In addition, the computer maps the selected logical record identifier within the logical record identifier index associated with the particular column of the data table that includes the data record having the particular key to a current committed physical record row identifier using a multi-version data record indirection mapping table stored in a storage-class memory of the computer (step 1012).

The computer also retrieves the current committed physical record row identifier that was mapped to the selected logical record identifier (step 1014). Further, the computer uses the retrieved current committed physical record row identifier to fetch from the hard disk drive the data record having the particular key in the data table (step 1016). Then, the computer deletes the data record having the particular key based on the received input to delete the data record (step 1018).

In addition, the computer sets an uncommitted physical record row identifier and a committed physical record row identifier corresponding to the deleted data record to null within the multi-version data record indirection mapping table using the selected logical record identifier (step 1020). Further, the computer traverses the primary key index associated with the data table to remove an entry in the primary key index for the deleted data record having the particular key (step 1022). The computer also traverses the logical record identifier index to remove an entry in the logical record identifier index for the deleted data record having the particular key that includes a value corresponding to a particular column within the data table where the deleted data record was removed (step 1024). Furthermore, the computer traverses the multi-version data record indirection mapping table to remove an entry in the multi-version data record indirection mapping table for the deleted data record (step 1026). Thereafter, the process terminates.

With reference now to FIG. 11, a flowchart illustrating a process for pessimistic two-version two-phase locking (2V2PL) using a multi-version data record indirection mapping table is shown in accordance with an illustrative embodiment. The process shown in FIG. 11 may be implemented in a computer, such as, for example, data processing system 100 in FIG. 1.

The process begins when the computer receives an input to perform a transaction on a set of data records within a data table stored on a hard disk drive of the computer (step 1102). Afterward, the computer sets, for each read request associated with the transaction, a read lock prior to reading current committed versions of the set of data records using current committed physical record row identifiers corresponding to the current committed versions of the set of data records within a multi-version data record indirection mapping table stored in a storage-class memory of the computer (step 1104). The computer may utilize, for example, a registered range-predicate of a read query or a next-key locking process for phantom data record detection. In addition, the computer sets, for each write request associated with the transaction, a write lock on each data record in the set of data records modified by the transaction prior to writing new uncommitted versions of the set of data records (step 1106).

Further, the computer sets, for each write request associated with the transaction, a certify lock on each data record in the set of data records modified by the transaction prior to finalizing the transaction to certify writes within the set of data records to ensure that no other active transaction with a repeatable read isolation level or higher is currently reading the current committed versions of the set of data records (step 1108). The computer may, for example, extend the write certification to satisfy the registered range-predicates. Subsequently, the computer makes a determination as to whether the computer received an input to commit the transaction (step 1110). If the computer determines that an input to commit the transaction was received, yes output of step 1110, then the computer commits the transaction (step 1112) and releases all previously set locks associated with the transaction (step 1114). Thereafter, the process terminates. If the computer determines that an input to commit the transaction was not received, no output of step 1110, then the computer aborts the transaction (step 1116) and the process returns to step 1114 thereafter.

Figure 12B:
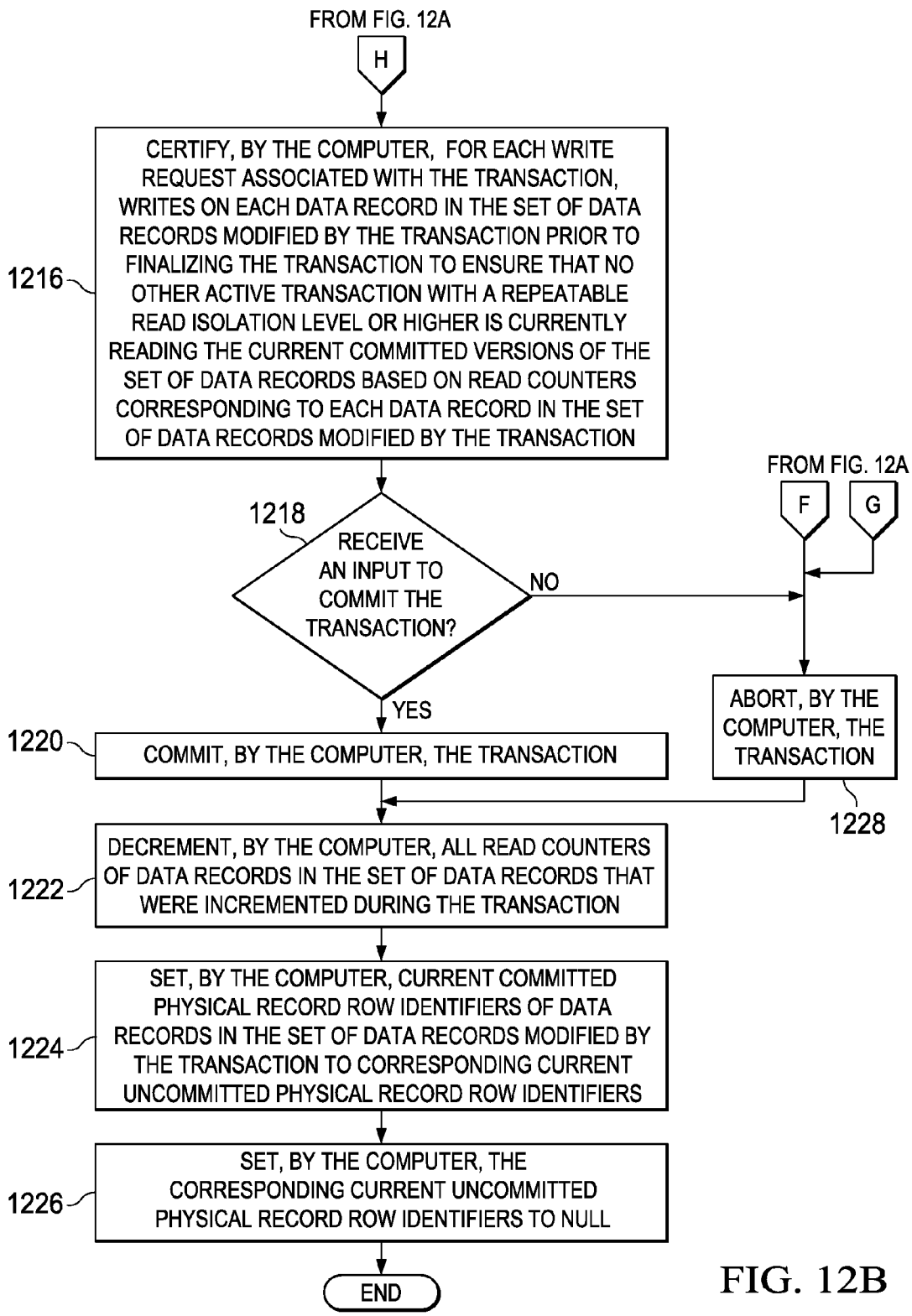

With reference now to FIGS. 12A-12B, a flowchart illustrating a process for latch-free pessimistic two-version two-phase locking using a multi-version data record indirection mapping table is shown in accordance with an illustrative embodiment. The process shown in FIGS. 12A-12B may be implemented in a computer, such as, for example, data processing system 100 in FIG. 1.

The process begins when the computer receives an input to perform a transaction on a set of data records within a data table stored on a hard disk drive of the computer (step 1202). Subsequently, the computer makes a determination as to whether a read counter corresponding to each data record in the set of data records is equal to or greater than zero (step 1204). For weaker non-repeatable read semantics, the computer may simply read the currently committed versions of the set of data records without checking or incrementing the read counter. If the computer determines that the read counter corresponding to each data record in the set of data records is not equal to or greater than zero, no output of step 1204, then the process proceeds to step 1228. If the computer determines that the read counter corresponding to each data record in the set of data records is equal to or greater than zero, yes output of step 1204, then the computer increments the read counter corresponding to each data record in the set of data records using a latch-free instruction (step 1206). The latch-free instruction may be, for example, an atomic compare-and-switch (CAS) operator.

Afterward, the computer reads, for each read request associated with the transaction, current committed versions of the set of data records using current committed physical record row identifiers corresponding to the current committed versions of the set of data records within a multi-version data record indirection mapping table stored in a storage-class memory of the computer (step 1208). In addition, the computer makes a determination as to whether a write-write conflict is detected for a data record in the set of data records to be modified by the transaction (step 1210). The current uncommitted physical record row identifier for a data record is itself an indicator for determining a write-write conflict. For example, a null value for the current uncommitted physical record row identifier for a data record indicates that no other active transaction is currently changing the corresponding data record. Conversely, a non-null value for the current uncommitted physical record row identifier indicates that another active transaction is already changing the corresponding data record. The computer may implement these operations by utilizing a latch-free instruction, such as compare-and-switch operator. If the computer determines that a write-write conflict is detected for a data record in the set of data records to be modified by the transaction, yes output of step 1210, then the process proceeds to step 1228. If the computer determines that a write-write conflict is not detected for a data record in the set of data records to be modified by the transaction, no output of step 1210, then the computer writes, for each write request associated with the transaction, a current version of each data record in the set of data records modified by the transaction (step 1212).

Subsequently, the computer updates the multi-version data record indirection mapping table with a current uncommitted physical record row identifier corresponding to the current version of each data record in the set of data records modified by the transaction (step 1214). Further, the computer certifies, for each write request associated with the transaction, writes on each data record in the set of data records modified by the transaction prior to finalizing the transaction to ensure that no other active transaction with a repeatable read isolation level or higher is currently reading the current committed versions of the set of data records based on read counters corresponding to each data record in the set of data records modified by the transaction (step 1216). Data record certification is satisfied when the read counter is equal to zero for each data record in the set of data records modified by the transaction. If a read counter is equal to zero (0), then the computer certifies the write of the corresponding data record and sets the read counter to minus one (−1), which indicates that the data record is in the process of write certification and its read counter cannot be incremented. If the read counter is not equal to zero, then the computer cannot certify the write of the corresponding data record and aborts and rolls back the transaction. The computer may implement these operations by utilizing latch-free instructions, such as compare-and-switch operators.

Furthermore, the computer makes a determination as to whether the computer received an input to commit the transaction (step 1218). If the computer determines that an input to commit the transaction was received, yes output of step 1218, then the computer commits the transaction (step 1220), decrements all read counters of data records in the set of data records that were read associated with the transaction (step 1222), sets current committed physical record row identifiers of data records in the set of data records modified by the transaction to corresponding current uncommitted physical record row identifiers (step 1224), and sets the corresponding current uncommitted physical record row identifiers to null (step 1226). Thereafter, the process terminates. If the computer determines that an input to commit the transaction was not received, no output of step 1218, then the computer aborts the transaction (step 1228) and the process returns to step 1222 thereafter.

Figure 13B:
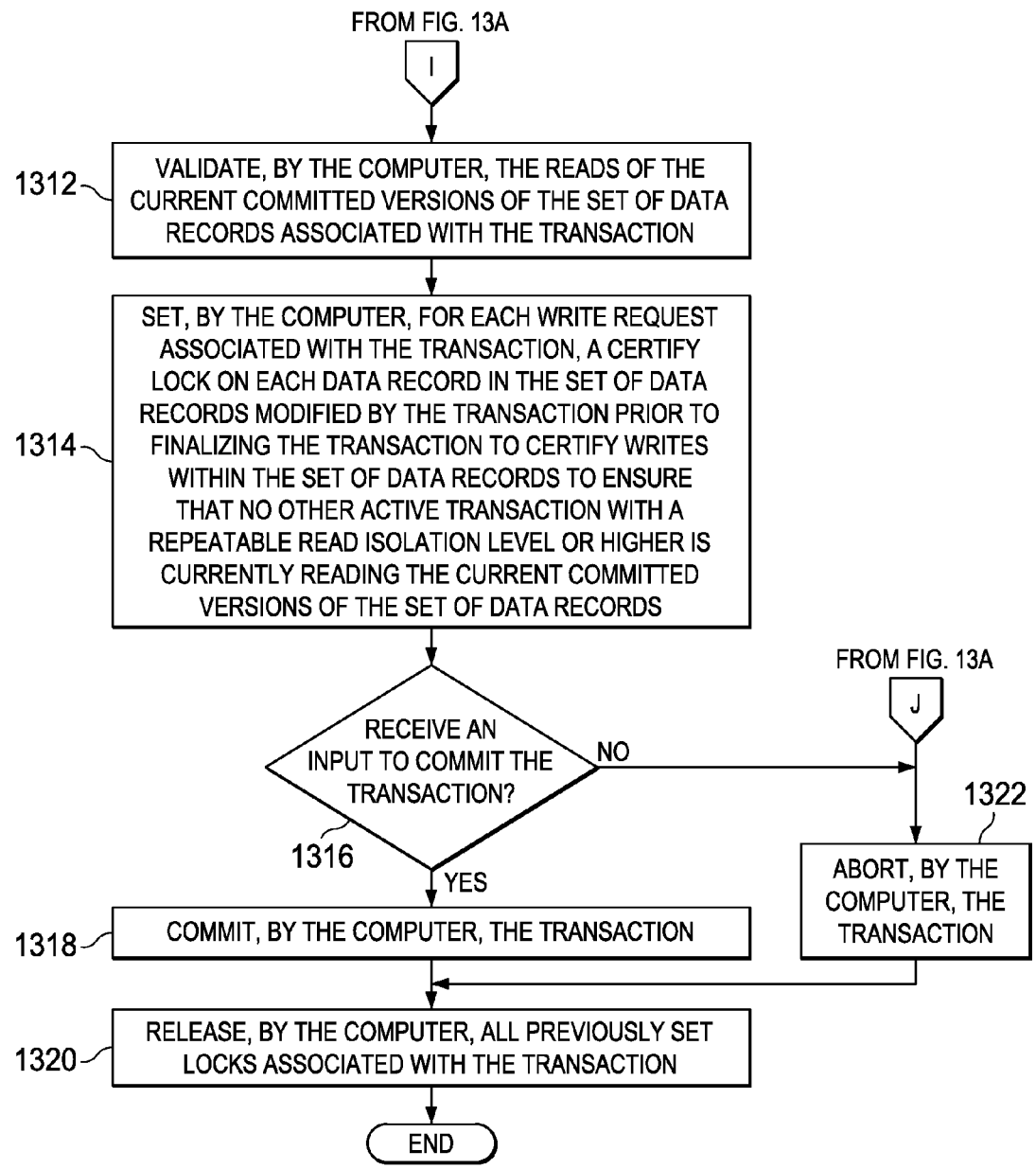

With reference now to FIGS. 13A-13B, a flowchart illustrating a process for optimistic two-version two-phase locking using a multi-version data record indirection mapping table is shown in accordance with an illustrative embodiment. The process shown in FIGS. 13A-13B may be implemented in a computer, such as, for example, data processing system 100 in FIG. 1.

The process begins when the computer receives an input to perform a transaction on a set of data records within a data table stored on a hard disk drive of the computer (step 1302). Afterward, the computer reads, for each read request associated with the transaction, current committed versions of the set of data records using current committed physical record row identifiers corresponding to the current committed versions of the set of data records within a multi-version data record indirection mapping table stored in a storage-class memory of the computer (step 1304). The computer may utilize, for example, a registered range-predicate of a read query for phantom data record detection. In addition, the computer sets, for each write request associated with the transaction, a write lock on each data record in the set of data records modified by the transaction prior to writing new uncommitted versions of the set of data records (step 1306). Further, the computer sets, for each read request associated with the transaction, a read lock prior to reading the current committed versions of the set of data records to validate reads (step 1308).

Subsequently, the computer makes a determination as to whether a current committed physical record row identifier corresponding to a data record in the set of data records has changed within the multi-version data record indirection mapping table from when it was first read (step 1310). If the computer determines that a current committed physical record row identifier corresponding to a data record in the set of data records has changed within the multi-version data record indirection mapping table from when it was first read, yes output of step 1310, then the process proceeds to step 1322. If the computer determines that current committed physical record row identifiers corresponding to data records in the set of data records have not changed within the multi-version data record indirection mapping table from when they were first read, no output of step 1310, then the computer validates the reads of the current committed versions of the set of data records associated with the transaction (step 1312).

In addition, the computer sets, for each write request associated with the transaction, a certify lock on each data record in the set of data records modified by the transaction prior to finalizing the transaction to certify writes within the set of data records to ensure that no other active transaction with a repeatable read isolation level or higher is currently reading the current committed versions of the set of data records (step 1314). The computer may, for example, extend the write certification to satisfy the registered range-predicates. Afterward, the computer makes a determination as to whether the computer received an input to commit the transaction (step 1316). If the computer determines that an input to commit the transaction was received, yes output of step 1316, then the computer commits the transaction (step 1318) and releases all previously set locks associated with the transaction (step 1320). Thereafter, the process terminates. If the computer determines that an input to commit the transaction was not received, no output of step 1316, then the computer aborts the transaction (step 1322) and the process returns to step 1320 thereafter.

Figure 14A:
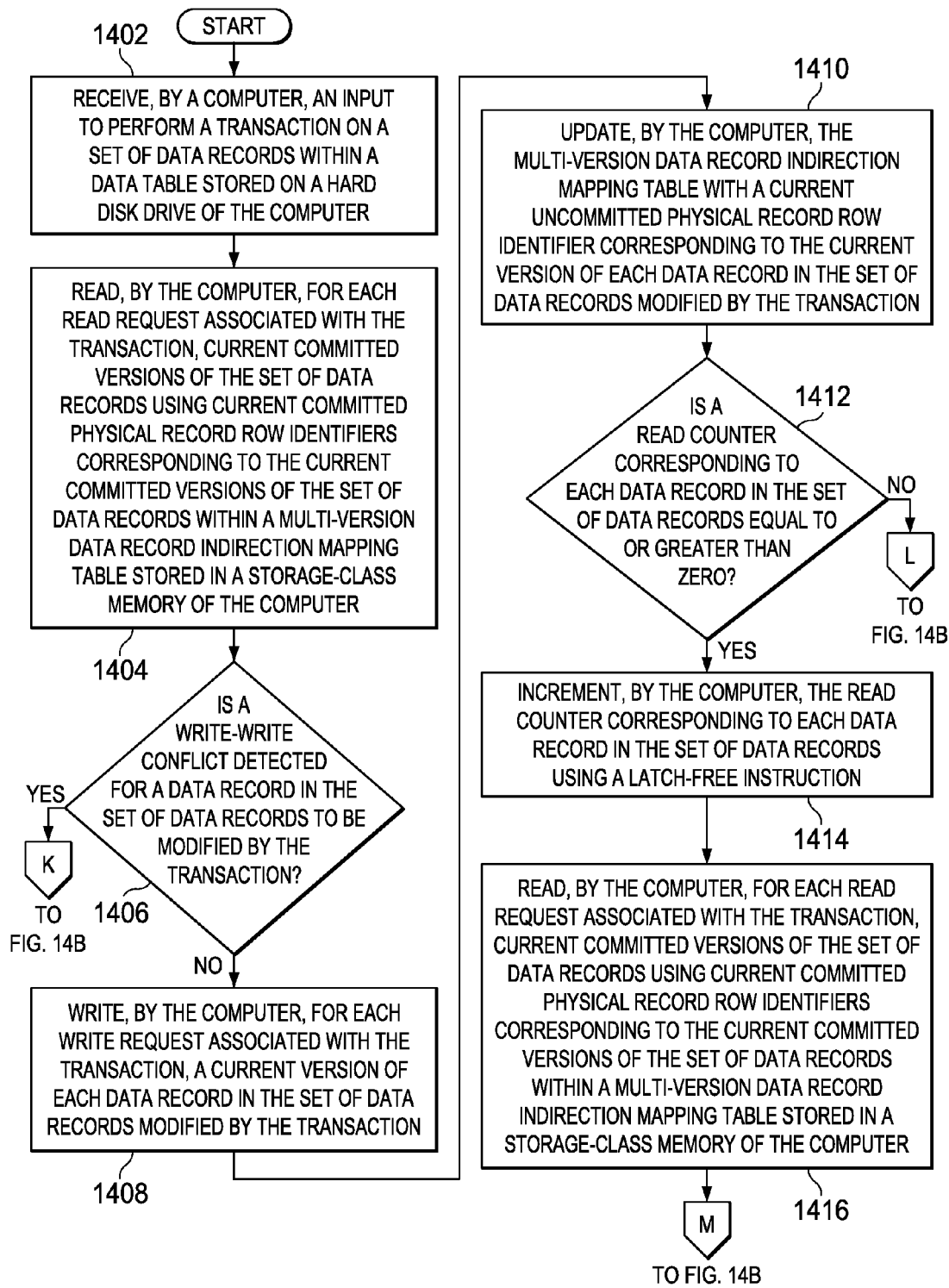
FIGS. 14A-14B are a flowchart illustrating a process for latch-free optimistic two-version, two-phase locking using a multi-version data record indirection mapping table in accordance with an illustrative embodiment.
Figure 14B:
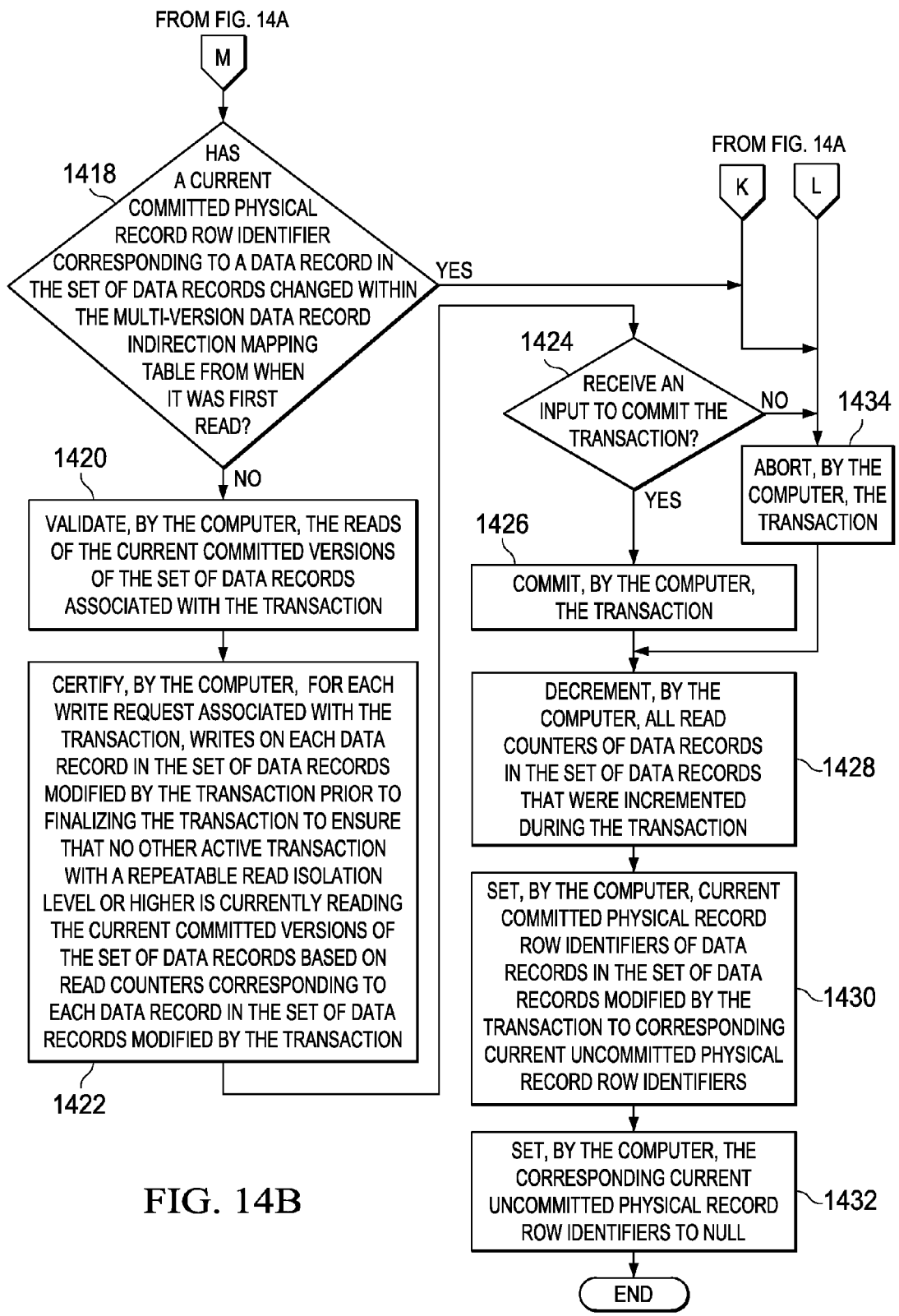

With reference now to FIGS. 14A-14B, a flowchart illustrating a process for latch-free optimistic two-version two-phase locking using a multi-version data record indirection mapping table is shown in accordance with an illustrative embodiment. The process shown in FIGS. 14A-14B may be implemented in a computer, such as, for example, data processing system 100 in FIG. 1.

The process begins when the computer receives an input to perform a transaction on a set of data records within a data table stored on a hard disk drive of the computer (step 1402). Subsequently, the computer reads, for each read request associated with the transaction, current committed versions of the set of data records using current committed physical record row identifiers corresponding to the current committed versions of the set of data records within a multi-version data record indirection mapping table stored in a storage-class memory of the computer (step 1404). The computer may utilize, for example, a registered range-predicate of a read query for phantom data record detection. In addition, the computer makes a determination as to whether a write-write conflict is detected for a data record in the set of data records to be modified by the transaction (step 1406). The current uncommitted physical record row identifier for a data record is itself an indicator for determining a write-write conflict. For example, a null value for the current uncommitted physical record row identifier for a data record indicates that no other active transaction is currently changing the corresponding data record. Conversely, a non-null value for the current uncommitted physical record row identifier indicates that another active transaction is already changing the corresponding data record. The computer may implement these operations by utilizing a latch-free instruction, such as compare-and-switch operator.

If the computer determines that a write-write conflict is detected for a data record in the set of data records to be modified by the transaction, yes output of step 1406, then the process proceeds to step 1434. If the computer determines that a write-write conflict is not detected for a data record in the set of data records to be modified by the transaction, no output of step 1406, then the computer writes, for each write request associated with the transaction, a current version of each data record in the set of data records modified by the transaction (step 1408). Further, the computer updates the multi-version data record indirection mapping table with a current uncommitted physical record row identifier corresponding to the current version of each data record in the set of data records modified by the transaction (step 1410).

The computer also makes a determination as to whether a read counter corresponding to each data record in the set of data records is equal to or greater than zero (step 1412). If the computer determines that the read counter corresponding to each data record in the set of data records is not equal to or greater than zero, no output of step 1412, then the process proceeds to step 1434. If the computer determines that the read counter corresponding to each data record in the set of data records is equal to or greater than zero, yes output of step 1412, then the computer increments the read counter corresponding to each data record in the set of data records using a latch-free instruction (step 1414).

Afterward, the computer reads, for each read request associated with the transaction, current committed versions of the set of data records using current committed physical record row identifiers corresponding to the current committed versions of the set of data records within a multi-version data record indirection mapping table stored in a storage-class memory of the computer (step 1416). Subsequently, the computer makes a determination as to whether a current committed physical record row identifier corresponding to a data record in the set of data records has changed within the multi-version data record indirection mapping table from when it was first read (step 1418). If the computer determines that a current committed physical record row identifier corresponding to a data record in the set of data records has changed within the multi-version data record indirection mapping table from when it was first read, yes output of step 1418, then the process proceeds to step 1434. If the computer determines that current committed physical record row identifiers corresponding to data records in the set of data records have not changed within the multi-version data record indirection mapping table from when they were first read, no output of step 1418, then the computer validates the reads of the current committed versions of the set of data records associated with the transaction (step 1420).

Furthermore, the computer certifies, for each write request associated with the transaction, writes on each data record in the set of data records modified by the transaction prior to finalizing the transaction to ensure that no other active transaction with a repeatable read isolation level or higher is currently reading the current committed versions of the set of data records based on read counters corresponding to each data record in the set of data records modified by the transaction (step 1422). Data record certification is satisfied when the read counter is equal to zero for each data record in the set of data records modified by the transaction. If a read counter is equal to zero (0), then the computer certifies the write of the corresponding data record and sets the read counter to minus one (−1), which indicates that the data record is in the process of write certification and its read counter cannot be incremented. If the read counter is not equal to zero, then the computer cannot certify the write of the corresponding data record and aborts and rolls back the transaction. The computer may implement these operations by utilizing latch-free instructions, such as compare-and-switch operators.

Subsequently, the computer makes a determination as to whether the computer received an input to commit the transaction (step 1424). If the computer determines that an input to commit the transaction was received, yes output of step 1424, then the computer commits the transaction (step 1426), decrements all read counters of data records in the set of data records that were incremented during the transaction (step 1428), sets current committed physical record row identifiers of data records in the set of data records modified by the transaction to corresponding current uncommitted physical record row identifiers (step 1430), and sets the corresponding current uncommitted physical record row identifiers to null (step 1432). Thereafter, the process terminates. If the computer determines that an input to commit the transaction was not received, no output of step 1424, then the computer aborts the transaction (step 1434) and the process returns to step 1428 thereafter.

Thus, illustrative embodiments provide a computer-implemented method, computer program product, and computer system for reducing database locking contention using index-aware multi-version data record concurrency control within the multi-version database. The persistence of a multi-version data record mapping table, together with an append-only tail of a data table approach for retaining all current versions of data records, plays a role in rapid recovery so that the indexes are still valid after a database system failure. If illustrative embodiments store data record LIDs with rows within the database log file, illustrative embodiments can recover the multi-version data record mapping table after the failure. Illustrative embodiments may further improve the recovery process by dropping the uRID values from the affected indexes, while leaving the cRID values in the multi-version data record mapping table. Also, because illustrative embodiments retain the old cRID values of committed data record versions, the undo recovery process or roll back is simplified and will not have an affect on the transaction accessing the committed data record versions, which also are accessible through the index.

The append-only insertion of data records into the tail of the data table further improves recovery time because the redo process will be limited to the tail of the data table, which also exhibits a faster sequential input/output pattern. In addition, only very long running transactions are undone that may require some random input/output data record accesses to mark earlier inserted data record versions as invalid or deleted. All dirty pages are flushed and committed, even under a no-force policy that enables a fast, fuzzy checkpoint, which results in a limited number of dirty pages and redo pages during the recovery process. Further, simple bufferpool eviction policies, such as, for example, stealing the oldest dirty page, or frequently committing the tail of the data table ensures a bounded recovery process with or without any checkpointing.

The multi-version data record indirection mapping of illustrative embodiments, in conjunction with the pessimistic and optimistic 2V2PL concurrency control model approaches, provides several benefits. First, no read locks, using the optimistic or the latch-free read counter process approaches, are acquired when populating transaction data record readsets that include a set of LID and cRID pairs of read data records fetched using the multi-version data record indirection mapping table, which speeds up the population of the transaction data record readset. Second, the update locks are held for the data record writeset of the transaction or the latch-free write-write conflict detection process is leveraged using the uRID values in the multi-version data record indirection mapping table.

Third, in the certification phase, the data record readset is verified by checking, in parallel using the multi-version data record indirection mapping table, the current LID and cRID values of corresponding data records in the readset. If a cRID of a data record has changed, then the transaction is aborted and rolled back and all of the previously held locks are released, unlike an in-place data record update scheme. The checking of the RID using the multi-version data record indirection mapping table is an indicator of a change in a corresponding data record for monotonically increasing RIDs. The RID also may serve as a non-global timestamp. The need for a global clock is avoided using the RID for validation. The new hard disk drive location of the data record indicated by the RID indicates a change to the data record and guarantees the correctness. Writers do not wait for uncertified readers (e.g., only readers must certify the data record readset for a repeatable read isolation level or a read stability consistency level). No sequential wait for locks exists. No locks are held while data records are being transferred from a slower storage medium to a faster storage medium. Parallel requests for read locks for an entire data record readset is possible using the optimistic 2V2PL concurrency control model. Fourth, implementing 2V2PL using an existing 2PL process allows both the 2V2PL and the 2PL to co-exist together.

The multi-version data record indirection mapping table maintains at least two RIDs. The cRID that points to the most recently committed version of a data record and the uRID that points to the most recently uncommitted version of the data record. Indexes no longer point to the RIDs, but instead point to the LIDs corresponding to data records. In addition, each index may point to at least two versions of a data record through a single LID, namely, the cRID and uRID pair. In general, the multi-version two-phase locking model may be generalized to multi-version data record indirection mapping to access the last predetermined number of data record versions of the index efficiently.

The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer-implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing a multi-version data record database, the computer-implemented method comprising:
    maintaining, by a computer, a mapping between a version-independent logical record identifier and current committed and uncommitted version-dependent physical record row identifiers corresponding to each data record within a plurality of data records of a data table using a multi-version data record indirection mapping table stored in a storage-class memory of the computer;
    updating, by the computer, entries within leaf pages of an index associated with the data table to point to the version-independent logical record identifier corresponding to a data record instead of pointing to the current committed and uncommitted version-dependent physical record row identifiers corresponding to the data record;
    reading, by the computer, the current committed version-dependent physical record row identifier corresponding to a particular data record from the multi-version data record indirection mapping table to access a current committed version of the particular data record within the data table while a writer is modifying the particular data record to prevent the writer from blocking access to the current committed version of the particular data record by a reader; and
    writing, by the computer, a new uncommitted version-dependent physical record row identifier corresponding to the particular data record in the multi-version data record indirection mapping table to insert a new uncommitted version of the particular data record within the data table while the reader is reading the current committed version of the particular data record to prevent the reader from blocking modification of the particular data record by the writer.

2. The computer-implemented method of claim 1, further comprising:
    writing, by the computer, the new uncommitted version-dependent physical record row identifier corresponding to the particular data record in the multi-version data record indirection mapping table to insert the new uncommitted version of the particular data record within the data table while one of a plurality of writers has yet to write an uncommitted value to the particular data record to resolve write-write conflict between the plurality of writers without utilizing locking.

3. The computer-implemented method of claim 1, further comprising:
    updating, by the computer, the multi-version data record indirection mapping table in response to performing one of an insert, update, or delete operation on the particular data record instead of updating the entries within the leaf pages of the index associated with the data table.

4. The computer-implemented method of claim 1, further comprising:
    responsive to the computer determining that a search operation is for committed versions of data records having a particular value associated with a particular column of the data table, mapping, by the computer, each logical record identifier to committed physical record row identifiers corresponding to the committed versions of the data records having the particular value using the multi-version data record indirection mapping table;
    using, by the computer, each of the committed physical record row identifiers to fetch from a hard disk drive all the committed versions of the data records within the data table having the particular value;
    responsive to the computer determining that the search operation is for uncommitted versions of the data records having the particular value associated with the particular column of the data table, mapping, by the computer, each logical record identifier to uncommitted physical record row identifiers corresponding to uncommitted versions of the data records having the particular value using the multi-version data record indirection mapping table; and using, by the computer, each of the uncommitted physical record row identifiers to fetch from the hard disk drive all the uncommitted versions of the data records within the data table having the particular value.

5. The computer-implemented method of claim 1, further comprising:

generating, by the computer, a new version of a data record based on a received input updating the data record;

placing, by the computer, the new version of the data record in a location at an end of the data table;

determining, by the computer, a current uncommitted physical record row identifier corresponding to the location at the end of the data table where the new version of the data record was placed;

updating, by the computer, an uncommitted physical record row column within the multi-version data record indirection mapping table with the determined current uncommitted physical record row identifier corresponding to the location of the new version of the data record using a logical record identifier associated with the data record;

setting, by the computer, a current committed physical record row identifier corresponding to the data record within a committed physical record row identifier column of the multi-version data record indirection mapping table to the determined current uncommitted physical record row identifier corresponding to the location of the new version of the data record; and setting, by the computer, the uncommitted physical record row column associated with the data record within the multi-version data record indirection mapping table to a null value.

6. The computer-implemented method of claim 1, further comprising:

inserting, by the computer, a data record in a location at an end of the data table based on a received input to insert the data record;

determining, by the computer, a current uncommitted physical record row identifier corresponding to the location at the end of the data table where the data record was placed;

generating, by the computer, a logical record identifier corresponding to the data record;

inserting, by the computer, an entry that includes the logical record identifier corresponding to the data record, a null committed physical record row identifier, and the current uncommitted physical record row identifier corresponding to the location of the data record into the multi-version data record indirection mapping table; and setting, by the computer, after transaction commit, the null committed physical record row identifier within the entry to the current uncommitted physical record row identifier corresponding to the location of the data record and setting the determined current uncommitted physical record row identifier within the entry to null.

7. The computer-implemented method of claim 1, further comprising:

deleting, by the computer, a data record from the data table based on a received input to delete the data record; and setting, by the computer, an uncommitted physical record row identifier and a committed physical record row identifier corresponding to the data record to null within the multi-version data record indirection mapping table using a logical record identifier associated with the data record.

8. The computer-implemented method of claim 1, further comprising:

setting, by the computer, for each read request associated with a transaction, a read lock prior to reading current committed versions of a set of data records using current committed physical record row identifiers corresponding to the current committed versions of the set of data records within the multi-version data record indirection mapping table;

setting, by the computer, for each write request associated with the transaction, a write lock on each data record in the set of data records modified by the transaction prior to writing new uncommitted versions of the set of data record;

setting, by the computer, for each write request associated with the transaction, a certify lock on each data record in the set of data records modified by the transaction prior to finalizing the transaction to certify writes within the set of data records to ensure that no other active transaction is currently reading the current committed versions of the set of data records; and responsive to the computer receiving an input to commit the transaction, committing, by the computer, the transaction and releasing all previously set locks associated with the transaction.

9. The computer-implemented method of claim 1, further comprising:

responsive to the computer determining that each read counter corresponding to each data record in a data record readset of a transaction is equal to or greater than zero, incrementing, by the computer, each read counter corresponding to each data record in the data record readset; and reading, by the computer, for each read request associated with the transaction, current committed versions of data records in the data record readset using current committed physical record row identifiers corresponding to the current committed versions of the data records in the data record readset within the multi-version data record indirection mapping table.

10. The computer-implemented method of claim 9, further comprising:

responsive to the computer determining that a write-write conflict is not detected for a data record in a data record writeset modified by the transaction, writing, by the computer, for each write request associated with the transaction, a current version of each data record in the data record writeset modified by the transaction;

updating, by the computer, the multi-version data record indirection mapping table with a current uncommitted physical record row identifier corresponding to the current version of each data record in the data record writeset modified by the transaction; and certifying, by the computer, for each write request associated with the transaction, writes on each data record in the data record writeset modified by the transaction prior to finalizing the transaction to ensure that no other active transaction is currently reading the current committed versions of the data record writeset based on read counters corresponding to each data record in the data record writeset.

11. The computer-implemented method of claim 9, further comprising:
responsive to the computer committing the transaction, decrementing, by the computer, all read counters incremented in the data record readset during the transaction.

12. The computer-implemented method of claim 1, further comprising:
responsive to the computer determining that current committed physical record row identifiers corresponding to a set of data records associated with a transaction have not changed within the multi-version data record indirection mapping table from when the set of data records was first read, validating, by the computer, reads of current committed versions of the set of data records associated with the transaction.

13. A computer system for managing a multi-version data record database, the computer system comprising:
a bus system;
a storage device connected to the bus system, wherein the storage device stores computer readable program code; and
a processor unit connected to the bus system, wherein the processor unit executes the computer readable program code to maintain a mapping between a version-independent logical record identifier and current committed and uncommitted version-dependent physical record row identifiers corresponding to each data record within a plurality of data records of a data table using a multi-version data record indirection mapping table stored in a storage-class memory of the computer system; update entries within leaf pages of an index associated with the data table to point to the version-independent logical record identifier corresponding to a data record instead of pointing to the current committed and uncommitted version-dependent physical record row identifiers corresponding to the data record; read the current committed version-dependent physical record row identifier corresponding to a particular data record from the multi-version data record indirection mapping table to access a current committed version of the particular data record within the data table while a writer is modifying the particular data record to prevent the writer from blocking access to the current committed version of the particular data record by a reader; and write a new uncommitted version-dependent physical record row identifier corresponding to the particular data record in the multi-version data record indirection mapping table to insert a new uncommitted version of the particular data record within the data table while the reader is reading the current committed version of the particular data record to prevent the reader from blocking modification of the particular data record by the writer.

14. The computer system of claim 13, wherein the processor further executes the computer readable program code to write the new uncommitted version-dependent physical record row identifier corresponding to the particular data record in the multi-version data record indirection mapping table to insert the new uncommitted version of the particular data record within the data table while one of a plurality of writers has yet to write an uncommitted value to the particular data record to resolve write-write conflict between the plurality of writers without utilizing locking.

15. The computer system of claim 13, wherein the processor further executes the computer readable program code to update the multi-version data record indirection mapping table in response to performing one of an insert, update, or delete operation on the particular data record instead of updating the entries within the leaf pages of the index associated with the data table.

16. A computer program product stored on a computer readable storage medium having computer readable program code encoded thereon that is executable by a computer for managing a multi-version data record database, the computer program product comprising:
computer readable program code to maintain a mapping between a version-independent logical record identifier and current committed and uncommitted version-dependent physical record row identifiers corresponding to each data record within a plurality of data records of a data table using a multi-version data record indirection mapping table stored in a storage-class memory of the computer;
computer readable program code to update entries within leaf pages of an index associated with the data table to point to the version-independent logical record identifier corresponding to a data record instead of pointing to the current committed and uncommitted version-dependent physical record row identifiers corresponding to the data record;
computer readable program code to read the current committed version-dependent physical record row identifier corresponding to a particular data record from the multi-version data record indirection mapping table to access a current committed version of the particular data record within the data table while a writer is modifying the particular data record to prevent the writer from blocking access to the current committed version of the particular data record by a reader; and
computer readable program code to write a new uncommitted version-dependent physical record row identifier corresponding to the particular data record in the multi-version data record indirection mapping table to insert a new uncommitted version of the particular data record within the data table while the reader is reading the current committed version of the particular data record to prevent the reader from blocking modification of the particular data record by the writer.

17. The computer program product of claim 16, further comprising:
computer readable program code to write the new uncommitted version-dependent physical record row identifier corresponding to the particular data record in the multi-version data record indirection mapping table to insert the new uncommitted version of the particular data record within the data table while one of a plurality of writers has yet to write an uncommitted value to the particular data record to resolve write-write conflict between the plurality of writers without utilizing locking.

18. The computer program product of claim 16, further comprising:
computer readable program code to update the multi-version data record indirection mapping table in response to performing one of an insert, update, or delete operation on the particular data record instead of updating the entries within the leaf pages of the index associated with the data table.

19. The computer program product of claim 16, further comprising:
computer readable program code, responsive to determining that a search operation is for committed versions of data records having a particular value associated with a particular column of the data table, to map each logical record identifier to committed physical record row identifiers corresponding to the committed versions of the data records having the particular value using the multi-version data record indirection mapping table;

computer readable program code to use each of the committed physical record row identifiers to fetch from a hard disk drive all the committed versions of the data records within the data table having the particular value;

computer readable program code, responsive to determining that the search operation is for uncommitted versions of the data records having the particular value associated with the particular column of the data table, to map each logical record identifier to uncommitted physical record row identifiers corresponding to uncommitted versions of the data records having the particular value using the multi-version data record indirection mapping table; and computer readable program code to use each of the uncommitted physical record row identifiers to fetch from the hard disk drive all the uncommitted versions of the data records within the data table having the particular value.

20. The computer program product of claim 16, further comprising:

computer readable program code to generate a new version of a data record based on a received input updating the data record;

computer readable program code to place the new version of the data record in a location at an end of the data table;

computer readable program code to determine a current uncommitted physical record row identifier corresponding to the location at the end of the data table where the new version of the data record was placed;

computer readable program code to update an uncommitted physical record row column within the multi-version data record indirection mapping table with the determined current uncommitted physical record row identifier corresponding to the location of the new version of the data record using a logical record identifier associated with the data record;

computer readable program code to set a current committed physical record row identifier corresponding to the data record within a committed physical record row identifier column of the multi-version data record indirection mapping table to the determined current uncommitted physical record row identifier corresponding to the location of the new version of the data record; and computer readable program code to set the uncommitted physical record row column associated with the data record within the multi-version data record indirection mapping table to a null value.

* * * * *